(12) United States Patent
Enomoto et al.

(10) Patent No.: US 6,844,110 B2
(45) Date of Patent: Jan. 18, 2005

(54) LITHIUM SECONDARY CELL AND ASSEMBLY THEREOF

(75) Inventors: Akio Enomoto, Chita-Gun (JP); Kenji Kawamura, Nagoya (JP); Kenshin Kitoh, Nagoya (JP); Toshihiro Yoshida, Nagoya (JP); Hiroshi Nemoto, Nagoya (JP); Shinji Otsubo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 402 days.

(21) Appl. No.: 09/863,108

(22) Filed: May 22, 2001

(65) Prior Publication Data

US 2001/0049054 A1 Dec. 6, 2001

(30) Foreign Application Priority Data

May 24, 2000 (JP) ........................... 2000-153702
Nov. 15, 2000 (JP) ........................... 2000-348784
Mar. 30, 2001 (JP) ........................... 2001-101872

(51) Int. Cl.$^7$ ............... H01M 2/02; H01M 4/00; H01M 6/10; H01M 2/08
(52) U.S. Cl. ............... 429/170; 429/94; 429/164; 429/178; 429/185
(58) Field of Search ............... 429/94, 178, 185, 429/170, 164

(56) References Cited

U.S. PATENT DOCUMENTS

| | | | | |
|---|---|---|---|---|
| 5,474,752 A | * | 12/1995 | Yamamoto | 252/519.1 |
| 5,501,916 A | * | 3/1996 | Teramoto et al. | 429/94 |
| 5,849,431 A | * | 12/1998 | Kita et al. | 429/164 |
| 6,139,986 A | | 10/2000 | Kurokawa et al. | |
| 6,399,242 B2 | | 6/2002 | Kitoh et al. | 791/53 |

FOREIGN PATENT DOCUMENTS

| | | | |
|---|---|---|---|
| JP | 9-92335 | 4/1997 | |
| JP | 10-162801 | * 6/1998 | H01M/2/12 |

OTHER PUBLICATIONS

U.S. Appl. No. 10/260,746, Kawamura et al., filed Sep. 30, 2002.

* cited by examiner

*Primary Examiner*—Patrick Ryan
*Assistant Examiner*—Julian Mercado
(74) *Attorney, Agent, or Firm*—Burr & Brown

(57) ABSTRACT

To provide a lithium secondary cell, which is excellent in productivity since a cell structure is simple and easy for assembly. Provided is a lithium secondary cell having: an internal electrode body including a positive electrode plate, a negative electrode plate, the positive electrode plate and the negative electrode plate being wound and laminated around an external periphery wall of a hollow cylindrical winding core, and inside the internal electrode body a nonaqueous electrolyte solution being impregnated, a cylindrical cell case contained in this internal electrode body 1 with both ends being opened, and two electrode caps sealing the above described internal electrode body 1 at both the open ends of this cell case. The electrode cap has a plate member sealing the internal electrode body and disposed so as to seal both the open ends of the above described cell case, an external terminal member protruding onto the surface of the electrode caps to lead out currents to outside, and an internal terminal member brought into connection with the internal electrode body and taking out currents from the internal electrode body, and an elastic body and at least two of the above described plate member, the external terminal member and the internal terminal member are joined together for construction. Furthermore, there is also provided an assembly of lithium secondary cells.

42 Claims, 12 Drawing Sheets

LITHIUM SECONDARY CELL AND ASSEMBLY THEREOF

BACKGROUND OF THE INVENTION AND RELATED ART STATEMENT

The present invention relates to a lithium secondary cell (hereinafter also to be referred to simply as "cell") and an assembly of lithium battery cells which comprises a plurality of lithium secondary cells and a plurality of bus bars (hereinafter also to be referred to simply as "assembly") and particularly relates to a lithium secondary cell excellent in productivity and an assembly of lithium battery cells which comprises a plurality of lithium secondary cells and a plurality of bus bars excellent in output performance and productivity.

In recent years, lithium secondary cells are widely used as a power source for electronic equipment such as portable communication equipment and a notebook-sized personal computer. In addition, requests for resource and energy savings are raised for the protection of the earth's environment on an international scale. The lithium secondary cell is being developed as a motor driving battery for an electric vehicle and a hybrid electric vehicle (hereinafter also referred to simply as "electric vehicle etc.").

A lithium secondary cell typically comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating the inside of the internal electrode body; a cylindrical cell case being opened at both ends for housing the internal electrode body; and two electrode caps sealing the above described internal electrode body at both ends of the cell case.

Among them, at least one of the electrode caps must be provided with a current lead-out function for leading current from the internal electrode body to the outside of the cell; a pressure release function for preventing explosion of the cell at times when pressure inside of the cell increases abnormally; and a function as an electrolyte solution injection port at the time when electrolyte solution is injected into the internal electrode body contained inside the cell case. While each of the electrode caps is a small volume part among parts constituting a lithium secondary cell, as shown in FIG. 1, the electrode caps are parts greatly influencing current output as well as the endurance of the cell.

Conventionally, an electrode cap is, as shown in FIG. 17, constructed by combining parts such as an electrode pole 50, a bolt 44, a nut 43, a cap 47, a metal ring 42, a pressure release valve 49, an electrolyte solution injection port 48, a ceramic washer 45, a backup ring 46, etc. (See JP-A-9-92335).

However, the electrode cap described in JP-A-9-92335 is provided with a current lead-out function, a pressure release function and a function as an electrolyte solution injection port, but it is constructed by a number of parts, thus giving rise to a problem that assembly efficiency on a cell is bad and mechanical production is difficult.

In addition, this conventional electrode cap has, as shown in FIG. 17, a pressure release valve 49 disposed in the vicinity of the outer peripheral portion of the electrode cap remote from the central axis of the cell case 54 and thus is not good at releasing gas from the hollow portion of the winding core in which a lot of gas causing an increase of inner pressure is contained, giving rise to a problem that explosion of a cell cannot be prevented unless pressure release valves are disposed at both the electrode caps of the positive electrode and the negative electrode.

Moreover, the conventional electrode cap has, as shown in FIG. 17, electrolyte solution injection port 48 disposed in the vicinity of the outer peripheral portion of the electrode cap remote from the central axis of the cell case 54 like the pressure release valve 49, and thus the hollow portion of the winding core cannot be impregnated from a lower portion of the cell with the electrolyte solution through an injection nozzle, but is impregnated with the electrolyte solution by poring from an upper side of the internal electrode body, giving rise to a problem that impregnation of the electrolyte solution is not easy and injection of the electrolyte solution takes a fair amount of time. In addition, the top or bottom electrode cap has the pressure release valve 49 and the; electrolyte solution injection port 48 disposed separately, and thus an area of a portion requiring sealing gets larger, giving rise to a problem that the electrolyte solution is apt to leak.

On the other hand, in order to drive a motor, a plurality of cells are brought into connection in series to secure a voltage necessary for driving. Actually, in electric vehicles etc., currents of 100 V or more could frequently flow by chance. Accordingly, in order to realize a high output feature and a large current feature, it is important to adopt a structure that will reduce connection resistance due to connection of cells as much as possible.

SUMMARY OF THE INVENTION

The present invention has been completed to solve such conventional problems. Therefore, the present invention is aimed at providing a lithium secondary cell with an improved productivity by using an electrode cap improved in its assembly efficiency and its functionality.

In addition, the present invention further is aimed at providing an assembly of lithium battery cells which comprises a plurality of lithium secondary cells and a plurality of bus bars having an improved output performance by suppressing connection resistance at the time of connecting a plurality of cells in series so as to exert its performance sufficiently, and is aimed at improving productivity by simplifying the structure of the assembly of cells.

That is, according to the present invention, provided is a lithium secondary cell which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating the inside of the internal electrode body; a cylindrical cell case being opened at both ends for housing the internal electrode body; and two electrode caps sealing the above described internal electrode body at both ends of the cell case, wherein two electrode caps seal the above described internal electrode body at both open ends of the cell case;

wherein each of the electrode caps is provided with a plate member sealing said internal electrode body and disposed so as to seal both open ends of the cell case, an external terminal member protruding onto the surface of the above described electrode caps to lead out currents to the outside of the cell, and an internal terminal member brought into connection with the internal electrode body and taking out currents from the internal electrode body; and wherein at least two members selected from the group consisting of the plate members, the external terminal members and the internal terminal members are joined together for construction.

In this embodiment, it is preferable that at least one member of the plate member, the external terminal member, and the internal terminal member is produced by press processing or cold forging, and thereby reduction in process costs and improvement in the yield factor can be expected. At least two members of the plate member, the external terminal member and the internal terminal member are preferably produced by a method selected from a group consisting of friction bonding, brazing, welding, clamping and forging clamping, and any combination of those methods.

In the present invention, at least one of the electrode caps preferably has a pressure release hole in a position corresponding with the central axis of the winding core, and the central axis of the winding core is preferably coaxial with the central axis of the cell case. Moreover, at least one of the external terminal members has a hollow portion which preferably functions as a pressure release path of the pressure release hole.

In addition, according to the present invention, provided is a lithium secondary cell which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body; and two electrode caps sealing the above described internal electrode body at both ends of the cell case, wherein each of two electrode caps is provided with a plate member sealing said internal electrode body and being disposed so as to seal both open ends of the cell case, an external terminal member protruding onto the surface of the electrode caps to lead out currents to the outside of the cell, an internal terminal member brought into connection with the internal electrode body and taking out currents from the internal electrode body, and an elastic body; and wherein at least two members selected from the group consisting of the plate members, the external terminal members and the internal terminal members are joined together for construction.

In this embodiment, the elastic body is preferably sandwiched between the plate member, the external terminal member and/or the internal terminal member, and preferably serves to electrically insulate the positive electrode and the negative electrode. In addition, the elastic body preferably has the electric resistivity of not less than $10^{10}$ Ω/cm, and is preferably made of at least two kinds of packing materials having different levels of hardness. In the case where the elastic body is sandwiched among any combination of the plate member, the external terminal member and the above described internal terminal member respectively, it is preferable that the amount of elastic body deformation, in a direction of pressure application used for bonding of the elastic body, is larger than the spring back amount, and the force of pressure application for bonding applied to the elastic body is not more than the quantity of force making the elastic body hold an elasticity maintenance percentage of 95% or more. In addition, the elastic body is preferably made of any of ethylene polypropylene rubber, polyethylene, polypropylene and fluororesin.

In the present invention, the external terminal member as well as the internal terminal member is preferably constructed with different metals; in particular the plate member, the external terminal member as well as the internal terminal member are made of Al, Cu, Ni or alloy of any of them; and at least two of the plate member, the external terminal member and the internal terminal member are preferably produced by a method selected from a group consisting of friction bonding, brazing, welding, clamping and forging clamping, and any combination of those methods.

In addition, in the present invention, the cell case and the electrode cap are preferably bonded by clamping processing which comprises forming clamping by applying pressure for bonding to the portion of the cell case in contact with the electrode cap and the outer peripheral portion of the electrode cap and/or welding processing which comprises welding the end portion of the cell case and the outer periphery of the electrode cap.

In addition, according to the present invention, provided is a lithium secondary cell which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body; and two electrode caps sealing the above described internal electrode body at both ends of the cell case, wherein each of the electrode caps is provided with a plate member sealing said internal electrode body and disposed so as to seal both open ends of the cell case, an external terminal member protruding onto the surface of the electrode caps to lead out currents to the outside of the cell, an internal terminal member brought into connection with the internal electrode body and taking out currents from the above described internal electrode body, and an elastic body being sandwiched between the plate member and the external terminal member, and between the plate member and the internal terminal member so as to absorb impact of pressure application for bonding between the plate member and the terminal member; and wherein a fixing material is disposed so as to apply pressure for bonding the plate member, the terminal member and the elastic body at a predetermined position.

In this embodiment, the elastic body is preferably sandwiched among any combination of the plate member, the external terminal member and the internal terminal member respectively, and preferably serves to electrically insulate the positive electrode and the negative electrode. In addition, the elastic body preferably has the electric resistivity of not less than $10^{10}$ Ω/cm, and is preferably made of at least two kinds of packing having different levels of hardness. In the case where the elastic body is sandwiched among any combination of the plate member, the external terminal member and the above described internal terminal member respectively, it is preferable that the amount of elastic body deformation, in a direction of pressure application used for bonding of the elastic body, is larger than the spring back amount, and the force of pressure application for bonding applied to the elastic body is not more than the quantity of force making the elastic body hold an elasticity maintenance percentage of 95% or more. In addition, the elastic body is preferably made of any of ethylene polypropylene rubber, polyethylene, polypropylene and fluororesin.

In the present invention, a part of the inner peripheral wall of the fixing material preferably has an inclination toward the outer peripheral wall of the terminal member, and this inclination is preferably 30° or less. In addition, the hardness of the fixing material is preferably the same as or larger than the hardness of the terminal member, and in particular, the fixing material and the terminal member are preferably made of any of Al, Al alloy, Cu, Cu alloy, brass and stainless steel.

In addition, in the present invention, the terminal member preferably has a stopper structure in order not so as to apply pressure to the elastic body beyond the pre-determined level for bonding. In addition, with the central axis of the terminal member being an axis, $r_1$ (mm) being the radius of the upper end of the terminal member and $r_2$ (mm) being the inside diameter of the upper end of the fixing material when the side on which the fixing material is disposed is placed upper than the position of the plate member being a reference, $r_1$ and $r_2$ preferably fulfill $r_1 > r_2$. With $\Delta r$ (mm) being a difference between $r_1$ (mm) and the above described $r_2$ (mm), $\Delta r$ preferably fulfills $\Delta r \geq 0.2$ mm.

With the central axis of the terminal member being an axis, when the side on which the fixing material is disposed is placed higher than the position of the plate member being a reference, the upper end of the terminal member preferably protrudes from the upper end of the fixing material. In addition, with $M_1$ (ton) being a force to extract the press-inserted fixing material and $M_2$ (ton) being an elastic force of the elastic body, $M_1$ and $M_2$ preferably fulfill a relationship of $M_1 > M_2$; $M_1$ and $M_2$ preferably fulfill a relationship of $M_1 \geq M_2 \times 2$; and $M_1$ more preferably fulfills a relationship of $M_1 \geq 1$ (ton). In addition, the upper end surface of the terminal member is preferably concave.

The structure of lithium secondary cell of the present invention is suitably adopted for large-sized cells having a cell capacity of 2 Ah or more. In addition, it is suitably adopted as a cell to be mounted on a vehicle and is suitably used as a power supply for starting an engine requiring a high output and as a power supply for driving a motor of an electric vehicle or a hybrid electric vehicle in which large currents are discharged frequently.

In addition, in the present invention, provided is an assembly of lithium battery cells which comprises a plurality of lithium secondary cells and a plurality of bus bars by bringing into connection a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body, and two electrode caps sealing the internal electrode body at both ends of the cell case, and each of the electrode caps comprising a plate member, an external terminal member and an internal terminal member;

wherein a positive electrode external terminal member of one of the plurality of the lithium secondary cells and a negative external terminal member of the lithium secondary cells other than said one of the plurality of the lithium secondary cells are brought into connection with a bus bar for construction.

In the present invention, it is preferable that at least one of electrode caps preferably has a pressure release hole, and that the bus bar is preferably formed by bonding at least two kinds of metal members in such a form that the bus bar does not blockblock the pressure release hole when the bus bar is fixed to the electrodes for the production of an assembly. Moreover, the pressure release hole is disposed in a position corresponding with the central axis of the winding core, the center axis of the winding core is coaxial with the central axis of the cell case, and the external terminal member has a hollow portion and is structured by using this hollow portion as the pressure release path of the pressure release hole to structure a lithium secondary cell. In this case, the bus bar preferably has a shape not to blockblock the hollow portion. In addition, the bus bar and the external terminal are bonded preferably by welding.

In addition, according to the present invention, provided is an assembly of lithium battery cells which comprises a plurality of lithium secondary cells and a plurality of bus bars bringing into connection with a plurality of bus bars a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body, and two electrode caps sealing the above described internal electrode body at both ends of the cell case and each of the electrode caps comprising a plate member, an external electrode member and an internal electrode member;

wherein the bus bar and the external terminal member are bonded by welding, and a portion of the bus bar being welded with the external terminal member and a portion of the external member being welded with the bus bar are made of a same kind of metal.

In addition, according to the present invention, provided is an assembly of lithium battery cells which comprises a plurality of lithium secondary cells and a plurality of bus bars bringing into connection with a plurality of bus bars a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body, and two electrode caps sealing the above described internal electrode body at both ends of the cell case, and each of the electrode caps comprising a plate member, an external terminal member and an internal terminal member;

wherein the bus bar and the external terminal member are bonded by welding, and the bus bar and the external terminal member are made of a same kind of metal.

In this embodiment, in particular, Al or Al alloy is preferably used for the external terminal members of the positive electrode and the negative electrode and the one including Al as a major component is preferably used for the bus bar, or Cu or Cu alloy is used for the external terminal members of the positive electrode and the negative electrode, and the one including Cu as the major component is preferably used for the bus bar, or Ni or Ni alloy is used for the external terminal members of the positive electrode and the negative electrode, and the one including Ni as the major component is preferably used for the bus bar.

In addition, according to the present invention, provided is an assembly of lithium battery cells which comprises a plurality of lithium secondary cells and a plurality of bus bars bringing into connection, by way of bonding by welding a plurality of the bus bars and the external terminal members, a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body, and two electrode caps sealing the above described internal electrode body at both ends of the cell case, and each of the electrode caps being provided with a plate member, an external terminal member and an internal terminal member;

wherein the bus bar is formed by bonding different kinds of metals.

In particular, Al or Al alloy is used for the external terminal of the positive electrode, and Cu or Cu alloy is used for the external terminal of the negative electrode, and preferably the one with Al as a major component and the one with Cu as a major component are bonded for forming the bus bar; alternatively, Al or Al alloy is used for the external terminal of the positive electrode, and Ni or Ni alloy is used for the external terminal of the negative electrode, and preferably the one with Al as a major component and the one with Ni as a major component are bonded for forming the bus bar.

In this embodiment, the bus bar is preferably the one produced by a method selected from a group consisting of friction bonding, brazing, welding, clamping, forging clamping, press-insertion, enveloped casting, explosive welding and close fit, and any combination of those methods.

In addition, according to the present invention, provided is an assembly of lithium battery cells which comprises a plurality of lithium secondary cells and a plurality of bus bars bringing into connection a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body; and two electrode caps sealing the internal electrode body at both ends of the cell case and at least one of said electrode caps having a pressure release hole, wherein each of the electrode caps is provided with a plate member sealing said internal electrode body and disposed so as to seal both open ends of the cell case, an external terminal member protruding onto the surface of the above described electrode, caps to lead out current to the outside of the cell case, an internal terminal member brought into connection with the internal electrode body and taking out current from the internal electrode body;

wherein at least two members selected from the group consisting of the plate member, the external terminal member and the internal terminal member are bonded; and wherein the pressure release hole is disposed in a position corresponding with the central axis of the winding core and the central axis of the winding core is coaxial with the central axis of the cell case, and the external terminal member has a hollow portion so that the hollow portion functions as a pressure release path for the pressure release hole to construct a lithium secondary cell; and wherein a positive electrode external terminal member of one of the plurality of the lithium secondary cells and a negative electrode external terminal member of the lithium secondary cells other than said one of the plurality of the lithium secondary cells having are brought into connection with a bus bar for construction.

The connecting structure body of lithium secondary cells of the present invention is suitably adopted for large-sized cells with a cell capacity of the above described lithium secondary cell of 2 Ah or more. In addition, the above described lithium secondary cell is suitably adopted in the case of a cell to be mounted on a vehicle, and is suitably used as an assembly of lithium battery cells which comprises a plurality of lithium secondary cells and a plurality of bus bars for a power supply for starting an engine requiring a high output and for a power supply for driving a motor of an electric vehicle or a hybrid electric vehicle in which large currents are discharged frequently.

DETAILED DESCRIPTION OF THE INVENTION

A lithium secondary cell of the present invention is roughly divided into first to eighth aspects. Incidentally, the first to third aspects relate to a lithium secondary cell, and the fourth to eighth aspects relate to an assembly of lithium battery cells which comprises a plurality of lithium secondary cells and a plurality of bus bars. The embodiments of the present invention will be described hereinafter for each aspect, but the present invention will not be limited to the following embodiments in any means.

A lithium secondary cell of the first aspect in the present invention is a lithium secondary cell which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body; and two electrode caps sealing the above described internal electrode body at both ends of the cell case, wherein two electrode caps seal the above described internal electrode body at both open ends of the cell case;

wherein each of the electrode caps is provided with a plate member sealing said internal electrode body and disposed so as to seal both open ends of the cell case, an external terminal member protruding onto the surface of the above described electrode caps to lead out current to the outside of the cell case, and an internal terminal member brought into connection with the internal electrode body and taking out current from the internal electrode body; and wherein at least two members selected from the group consisting of the plate member, the external terminal member and the internal terminal member are joined together for construction. In this case, it is preferable that at least one of the plate member, the external terminal member, and the internal terminal member is one produced by press processing or cold forging. Since each member constituting the electrode cap has a simple structure, each member can be manufactured inexpensively and easily with these processings.

For the lithium secondary cell according to the present invention, the configuration of its major portion will be described with reference to FIG. 1 and FIG. 2.

Figure 1:
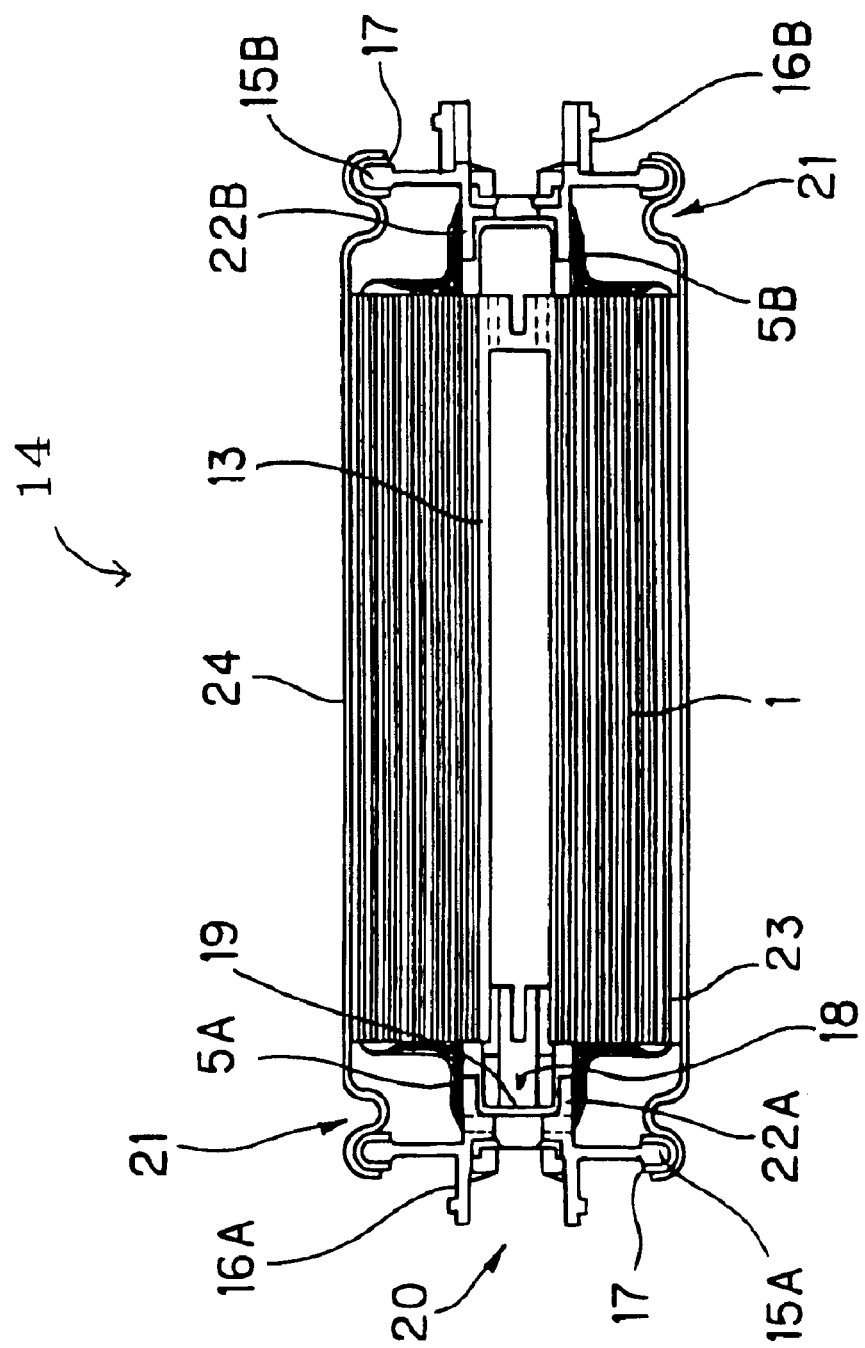
FIG. 1 is a sectional view showing an embodiment of a lithium secondary cell of the present invention.

For configuration of a lithium secondary cell according to the present invention, it comprises, as having been shown schematically in FIG. 1, an internal electrode body 1 comprising a positive electrode plate, a negative electrode plate wound and laminated around an external peripheral wall of a hollow cylindrical winding core 13 with a separator being sandwiched therebetween, and a nonaqueous electrolyte solution impregnating inside the internal electrode body 1; a cylindrical cell case 24 for the internal electrode body 1 being opened at both ends; and two electrode caps sealing the above described internal electrode body 1 at both the open ends of the cell case 24. For production of the lithium secondary cell 14, electricity collection tabs for positive electrode 5A and electricity collection tabs for negative electrode 5B attached to both the ends of the internal electrode body 1 are brought into connection respectively with the positive electrode internal terminal 22A and the negative electrode internal terminal 22B. Here, the internal terminal is referred to as a member bringing electricity collection tabs collectively into connection intermediately inside the cell, and those made of aluminum or aluminum alloy are preferably used for the positive electrode internal terminal 22A to which the electricity collection tab for positive electrode 5A is brought into connection and those made of copper or copper alloy or nickel or nickel alloy are preferably used for the negative electrode internal terminal 22B to which the electricity collection tab for negative electrode 5B is brought into connection, respectively. Otherwise, also for the internal terminal member, those subject to plating Ni onto aluminum, copper, iron, SUS, etc. can be suitably used.

Figure 3:
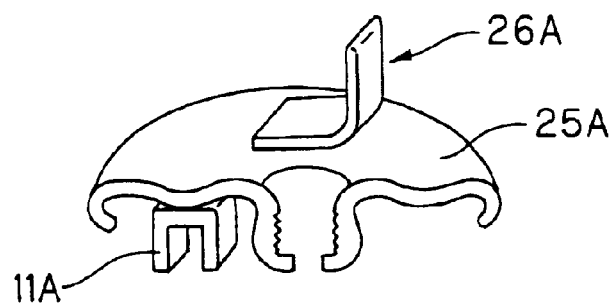
FIG. 3 is a perspective view showing an embodiment of an electrode cap having a pressure release function in the lithium secondary cell of the present invention.

Incidentally, the internal terminal member 11A in FIG. 3 is exemplified by a rivet-shaped one brought into connection with electricity collection tabs by pressure application, but there are no limitations on shapes thereof. In addition, since an oxidation film is apt to form on the surface thereof, in the case of aluminum and copper plate, this oxidation film makes contact resistance between the electricity collection tabs and the internal terminal members large. Furthermore, the value thereof often fluctuates. Therefore, in order to reduce the fluctuation in the contact resistance in the connecting portions, collective connection of the electricity collective tabs into the internal terminal members 11A is preferably carried out by welding.

In addition, it is preferable that the internal terminal members are attached to plate members respectively in advance, and at the same time as for the plate members, external terminal members are respectively attached onto another face where the internal terminal members are disposed. Here, the plate members are members to seal the internal electrode body and as their materials, the same metal materials such as aluminum, copper, and Ni as the internal terminal members are preferably used, and moreover, aluminum and copper plated with Ni can be used preferably. In addition, the external terminal members are terminal members to take currents outside the cell, and if they are made of solid metal materials, there are no limitations in particular on their qualities. The external terminal member may be constructed as exemplified in FIG. 1 so that a plurality of cells 14 will be able to be connected in series simply and firmly with a smaller contact resistance.

In order to take advantage of such a feature, it is preferable that the internal terminal member and the plate member as well as the plate member and the external terminal member are respectively joined firmly by welding so as to make contact resistance small. Thus, in the case where the plate member is made of metal materials, the internal terminal member and the external terminal member are connected inevitably so as to form a current path. In this case, the cell ends will be structured simply and improvement in assembly efficiency on a cell can be attained.

Figure 2:
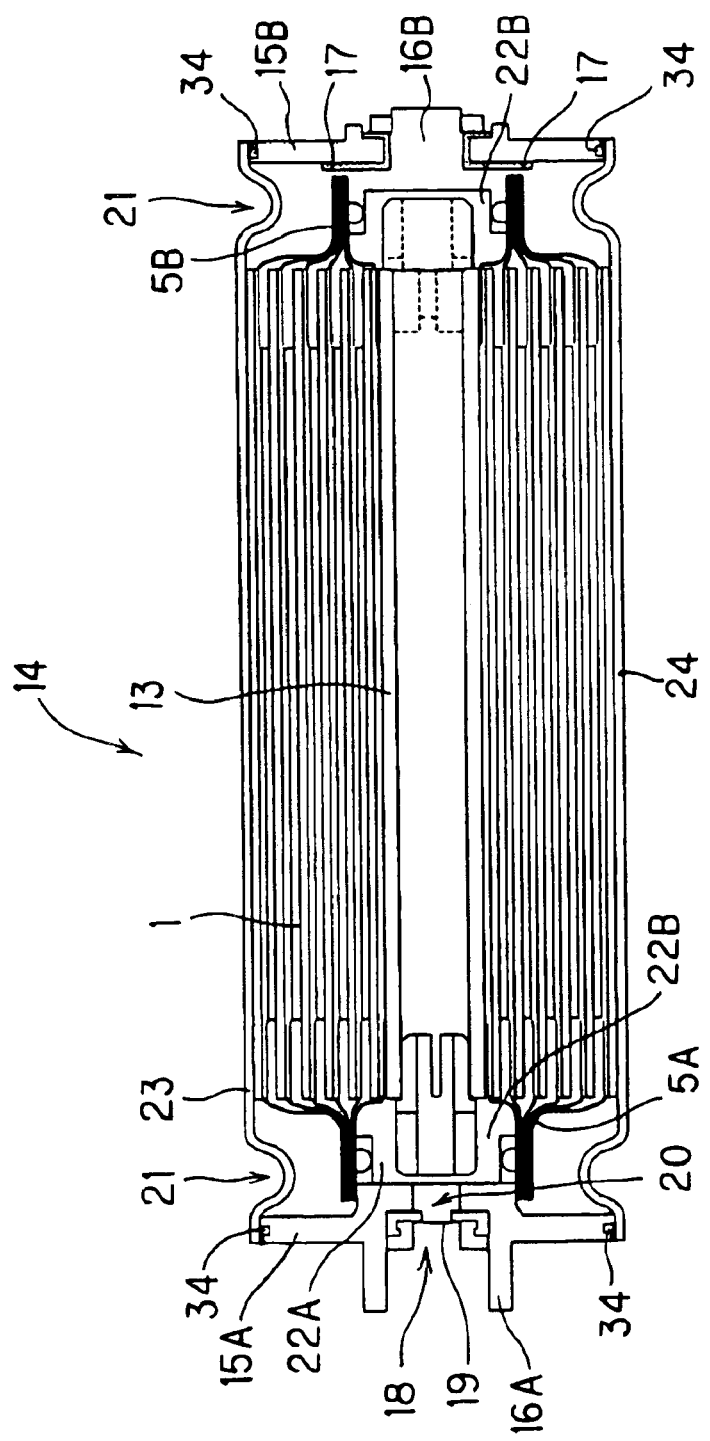
FIG. 2 is a sectional view showing another embodiment of a lithium secondary cell of the present invention.

The both cells 14 shown in FIG. 1 and FIG. 2 have the same basic structure and materials used for respective members. Thus, the characteristic features of those cells are differences in cell-sealing methods and the structures of electrode caps attributed to the methods. The cell 14 in FIG. 1 is provided with a restriction processed portion 21 at the nearest position to the respective electrode caps, and the packing 17 is sandwiched respectively by the cell case 24 and one of the electrode caps, and the cell 14 is sealed by clamping processing the electrode caps. In contrast, while the cell 14 in FIG. 2 is provided with a restriction processed portion 21 at the nearest position to the respective electrode caps similarly to the cell 14 in FIG. 1, however, the cell case 24 and the electrode caps are disposed so as to be brought into direct contact and subject to clamping process likewise, the cell is sealed by welding the above described contact portion of the respective electrode caps and the cell case. The welded portion 34 is preferably formed in the whole outer periphery of the electrode caps and the whole tip portions of the cell case 24.

That is, the cells 14 in FIG. 1 and FIG. 2 are at first, provided with restriction processed portions 21 at the nearest position to the respective electrode caps so that positioning and fixing of the electrode caps in the cells are carried out, and then the cell case 24 and the electrode caps sandwiching the packing 17 are calked or the cell case 24 and the electrode caps without sandwiching the packing 17 are calked and are welded to seal the respective cells. The lithium secondary cell of the present invention, which is supposed to be mounted on an electric vehicle etc. as its application, requires not only high output and low internal resistance but also holding performance at the time of operation or during a long period. The cell 14 in FIG. 1 involves a sealing method by restriction processing as well as clamping processing, and appropriate packing materials will be selected and appropriate clamping stress is applied so as to provide sufficient long-term holding performance as a cell to be mounted on a vehicle. The cell 14 in FIG. 2 undergoes restriction process as well as clamping processing and moreover welding so that stress applicable to the lithium secondary cell such as vibration etc. can be dispersed, and also when it is used as a cell to be mounted on a vehicle, it can keep the cell air-tight for a long period of time even when vibration is continuously applied thereto during a travel of a vehicle on which the lithium secondary cell is loaded.

In addition, in the lithium secondary cell according to the present invention, metal materials are used for the internal terminal member, the plate member, the external terminal member constructing the electrode cap and, as described later, metal materials are also used for the cell case. Therefore, in order to prevent currents from being short-circuited, some portion between the positive electrode and the negative electrode must be insulated. In the cell 14 in FIG. 1 insulation is achieved by providing the packing 17 being sandwiched by both the ends of the positive and the negative electrode caps which do not pass currents. The cell 14 in FIG. 2 brings the electrode caps and the cell case 24 into contact to form a current path, and therefore insulation is achieved by providing the structure involving the packing 17 being sandwiched by the negative electrode cap 15B (equivalent to the plate member) and the negative electrode internal terminal 22B (equivalent to the internal terminal member) as well as the negative electrode external terminal 16B (equivalent to the external terminal member) which does, not pass currents.

In addition, in the first aspect, at least two of the plate member, the external terminal member and the internal terminal member are preferably produced by a method selected from a group consisting of friction bonding, brazing, welding, clamping and forging clamping, and any combination of those methods. Among them, in order to reduce internal resistance, it is especially preferable that bonding of the electrode cap is carried out by welding. Incidentally, the above, described electrode cap is naturally a concept including both of a positive electrode and a negative electrode caps.

In addition, as shown in FIG. 1 and FIG. 2, in the lithium secondary cell of the first aspect, at least one of the electrode caps preferably has a pressure release hole at a position corresponding with the central axis of the winding core. At this time, the central axis of the winding core is preferably coaxial with the central axis of the cell case, and the external terminal member has a hollow portion so that this hollow portion preferably functions as a pressure release path of the pressure release hole.

In lithium secondary cell, the internal electrode body is normally disposed in the center of the cell, and in the case where a column-type internal electrode body is used, the central axis of the winding core will inevitably be disposed coaxial with the central axis of the cell case. In this case, if the pressure release hole is provided in a position corresponding with the central axis of the winding core, the pressure release hole will be easily able to be structured in an integral manner together with the external terminal as shown in FIG. 1 and FIG. 2. In order to integrate the external terminal and the pressure release hole 18, the pressure release valve provided for the pressure release hole 18 must realize a structure having simplicity and pressure release operating performance so as to be housed inside the external terminal. The present invention is the one that has realized this and simplified the electrode cap structure as a whole.

Thus, the internal electrode body 1 to which the plate member etc. is attached is inserted into a cylindrical cell case 24. As the cell case 24, a metal pipe is suitably used, and aluminum pipe and a stainless steel pipe are suitably used. Thus, since a metal member is used as the cell case 24, it is preferable that an insulating polymer film 23 is sandwiched between the internal face of the cell case 24 and the external periphery of the internal electrode body 1 so that electrical connection between the internal electrode body 1 and the cell case 24 and electrical connection between the electricity collection tabs 5A and 5B and the cell case 24 are prevented. However, in the case where the separator 4 covers the entire outer periphery of the internal electrode body 1, the insulating polymer film 23 is not always required in the outer peripheral portion of the internal electrode body 1.

In order to suppress movements of the internal electrode body 1 in the radial direction in spite of modes of use of the insulating polymer film 23, it is preferable that the clearance between the outer periphery of the internal electrode body 1 and the inner face of the cell case 24 is made small to an extent that insertion of the internal electrode body 1 is not difficult, and further preferably, it is preferable that the internal electrode body 1 is designed to receive compression stress from the cell case 24 after completion of the cell.

Thus, under a state that the internal electrode body 1 is inserted into the cell case 24, in consideration of length of the electricity collection tabs 5A and 5B and the winding core 13 between the portion in the vicinity of end face of the internal electrode body 1 and the electrode caps, the cell case 24 undergoes restriction processing so that the restriction processed portion 21 protruding into the inner periphery side is formed. Forming of this restriction processed portion 21 makes fixation of the electrode caps easy and plays an assistant role to suppress movements of the internal electrode body 1 in the longitudinal direction. In addition, the forming position of the restriction processed portion 21 plays an important role to determine fixing position of the electrode caps.

Next, the above described electrode cap will be described further in detail. FIG. 3 shows a portion of the cell structure shown in FIG. 1 of an example of the electrode cap in an enlarged fashion, which is composed of the L-shaped external terminal member 26A, the plate member 25A having hollow hole in the center and the internal terminal member 11A with which the electricity collection tab 5 is brought into connection by pressure application. These are simply shaped members and can be easily molded by press processing, and respective members are bonded so that an electrode cap having the above described necessary function will become producible extremely simply.

Figure 4:
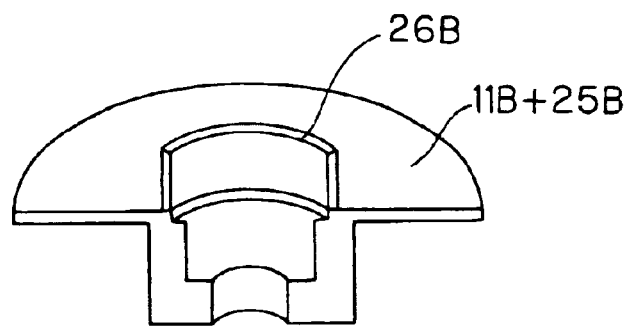
FIG. 4 is a perspective view showing an embodiment of another electrode cap having a pressure release function in the lithium secondary cell of the present invention.

Another embodiment of the electrode cap is shown in FIG. 4. This electrode cap is constructed by a member into which an external terminal member 26B standing up perpendicularly, to the plate member 25B being hollow in the center, the internal terminal member 11B and the plate member are integrated, and the two members are produced by bonding. Similarly to the electrode cap in FIG. 3, it is a simply shaped member and easily moldable by press processing.

Like these, the production step without a number of parts but only by press molding and welding, etc. can be carried out inexpensively in terms of manufacturing costs and provides a good yield factor and can lower the manufacturing costs of a lithium secondary cell. In addition, the electrode cap of the present invention is constructed by a small number of parts so that the lithium secondary cell can be deigned to be less heavy, and therefore is believed to lead to its accelerating performance and extension of the life of cells in an electric vehicle etc. to be used by connecting a number of cells in series.

Figure 5:
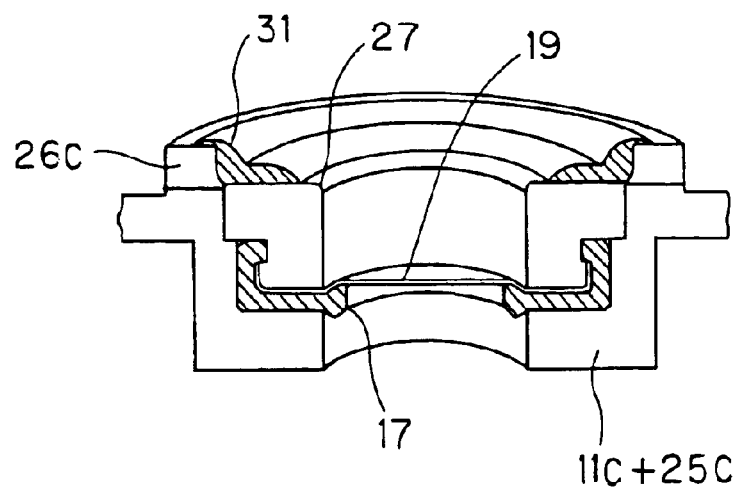
FIG. 5 is a perspective view showing an embodiment of still another electrode cap having a pressure release function in the lithium secondary cell of the present invention.

Incidentally, in general, the lithium secondary cell is provided with a pressure release valve at the cell end as a safety mechanism for preventing an accident involving explosion of a cell due to evaporation of the electrolyte solution to increase in the internal pressure of the cell in the case where overcharging or over discharging increases the temperature of a cell. The lithium secondary cell using the electrode caps shown in FIG. 3 takes a system to release pressure by removing the above described cap in its entirety at the time when the internal pressure increases. In that case, the pressure maybe set to an intended level by adjusting a level of clamping process for the internal electrode body and the cell case. In a lithium secondary cell with an electrode cap shown in FIG. 4, since the external terminal member 26B has a hollow portion, it is preferable to adopt a pressure release valve structure composing metal foil 19/an elastic body 17/a metal spacer 27 as shown in FIG. 5 in order to provide the external terminal member 26B with a pressure release function. Thus, when the metal foil 19 is attached by pressure application for bonding with the metal spacer 27 etc. so as to block the hollow portion, the metal foil 19 releases the internal pressure of a cell into the atmosphere only with explosion of the metal foil 19 if the internal pressure of a cell increases.

Figure 15:
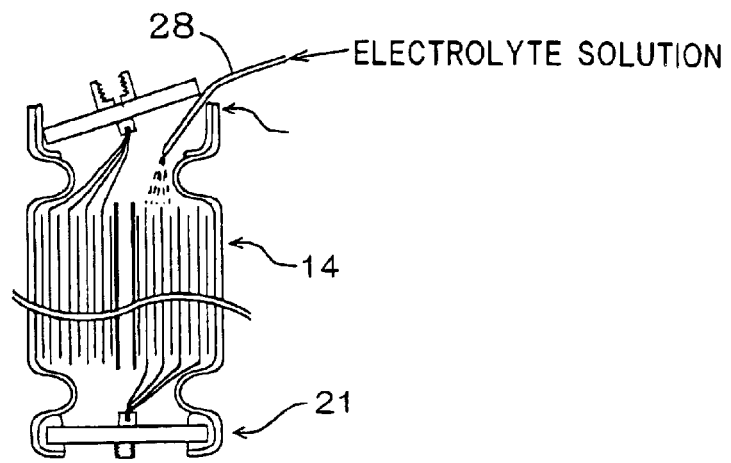
FIG. 15 is an explanatory view showing an example of an electrolyte solution filling method in a lithium secondary cell.

Incidentally, filling of nonaqueous electrolyte solution in a lithium secondary cell will be described next. The lithium secondary cell using the electrode cap shown in FIG. 3, as shown in FIG. 15, under a state that only one end of the cell case has been sealed, is disposed under a reduced atmosphere with the opening of the other end as the upper side to inject the electrolyte solution into the internal electrode body, and after a predetermined electrolyte solution impregnates inside the internal electrode body sufficiently, unnecessary electrolyte solution is discharged under an inert gas atmosphere and finally the opening is sealed.

Figure 16:
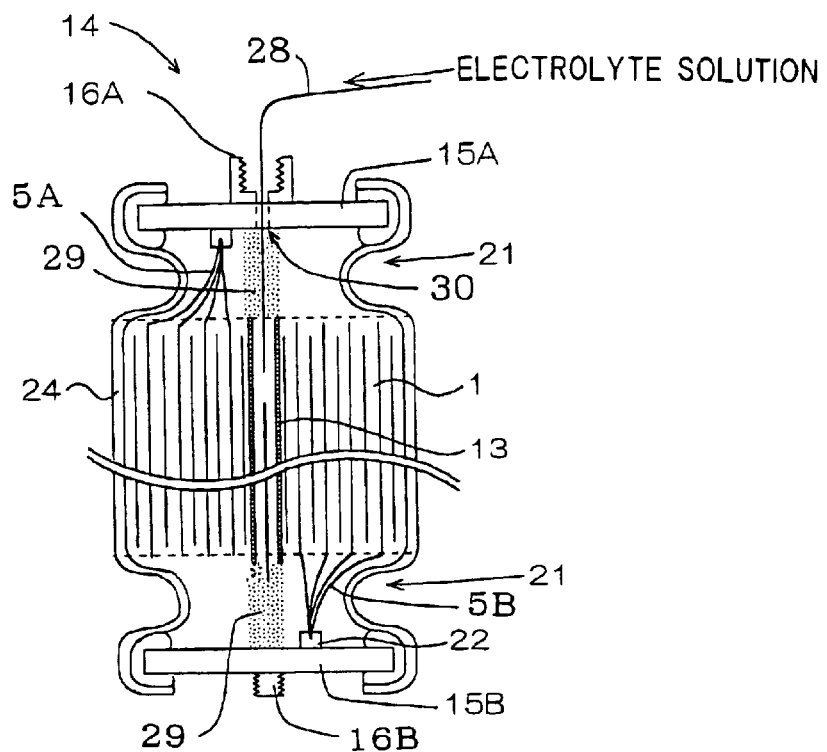
FIG. 16 is an explanatory view showing another example of an electrolyte solution filling method in a lithium secondary cell.
Figure 17:
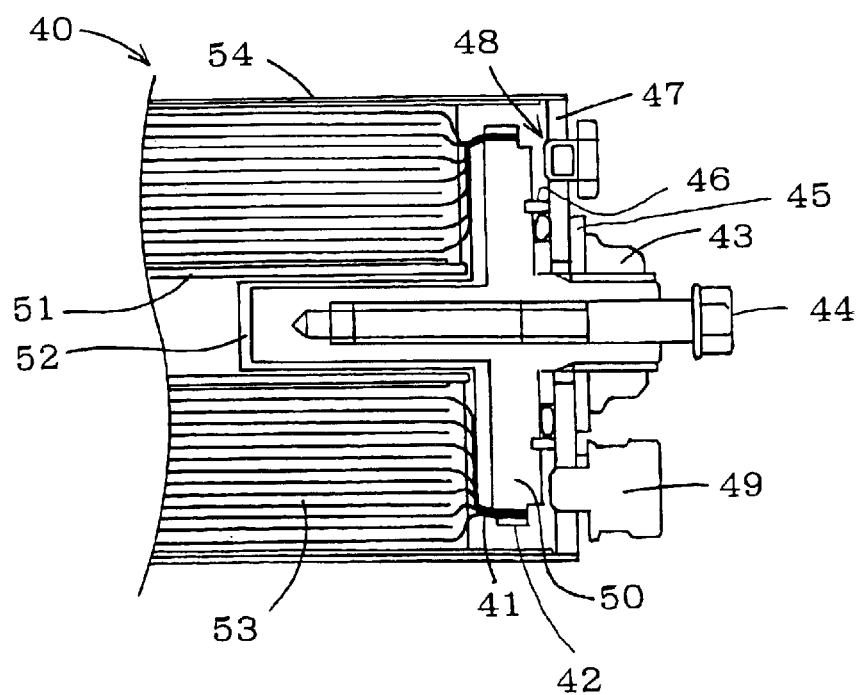
FIG. 17 is a sectional view showing an embodiment in a prior art lithium secondary cell.

In a lithium secondary cell with electrode caps shown in FIG. 4 and FIG. 5, the plate members 25B and 25C are hollow, and in addition, taking it advantage that the winding core of the internal electrode body is shaped as a hollow cylinder, as shown in FIG. 16, after both the ends of the cell case 24 are sealed, an electrolyte solution injection nozzle 28 is inserted to reach the other end of the cell through the central hollow portion of the plate member and the externally extended area 29 of the winding core, and the nonaqueous electrolyte solution is injected and thereafter the above described hollow portion is sealed with a metal foil etc. This method is preferable since the electrolyte solution is filled easily and swiftly. This method can minimize the area for port 30 injecting the electrolyte solution which often leads to leakage of the electrolyte solution and a drop in air-tightness, thereby the reliability of the cell can be improved. Of course, also in the electrode cap in FIG. 3, the central hollow portion of the plate member 25A can be altered to the same shape as the plate members in FIG. 4 and FIG. 5, and the pressure release structure and the electrolyte solution injecting method as in the case of the electrode caps in FIG. 4 and FIG. 5 can be adopted.

That is, in the case of the present invention, one member is made to have multiple functions, like this. Thus, the electrode cap of the lithium secondary cell of the present invention shown in FIG. 3, FIG. 4 or FIG. 5 possesses a pressure release function and an electrolyte solution injection function or the like at the same time while it is simple in the shape.

The above-mentioned electrode cap shown in any of FIG. 3, FIG. 4 and FIG. 5 maybe used for both the positive electrode and the negative electrode. However, the structure of the electrode cap shown in any of FIG. 3, FIG. 4 and FIG. 5 may be preferably used for the positive electrode cap.

Next, an electrode cap having functions different from the above described one will be described with reference, to FIG. 6, FIG. 7, FIG. 8 and FIG. 9. These electrode caps are also usable for the positive electrode and the negative electrode, without any restriction. In the present invention, in order to improve long-term vibration resistance performance of the cell, a cell structure by welding the cell case 24 with the electrode cap may be adopted, like shown in FIG. 2. In this case, currents must be inevitably insulated inside the electrode cap, and it will become necessary to make the electrode cap of either the positive electrode or the negative electrode has an insulating function. In the case of the cell 14 shown in FIG. 2, since the positive electrode cap 15A is made to have a pressure release function, there is adopted an electrode cap for a negative electrode having an insulating function.

Figure 6:
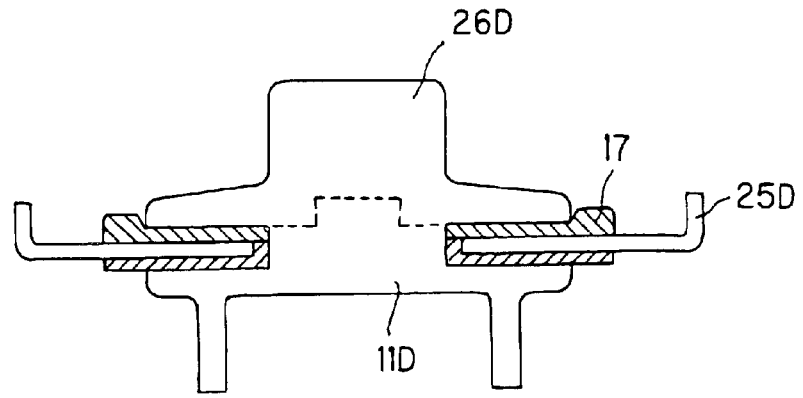
FIG. 6 is a sectional view showing an embodiment of an electrode cap having an insulating function in the lithium secondary cell of the present invention.

The cap shown in FIG. 6 comprises an external terminal member 26D made of an Al member, an internal terminal member 11D made of a Cu member connected with an electricity collection tabs under application of pressure, a packing 17 passing no electricity, and a plate member 25D being sandwiched by said packing, wherein said external terminal member 26D and said internal terminal member 11D are bonded by sandwiching said packing 17 at outer portion therebetween, and said plate member 25D is fixed by said packing 17.

Figure 18:
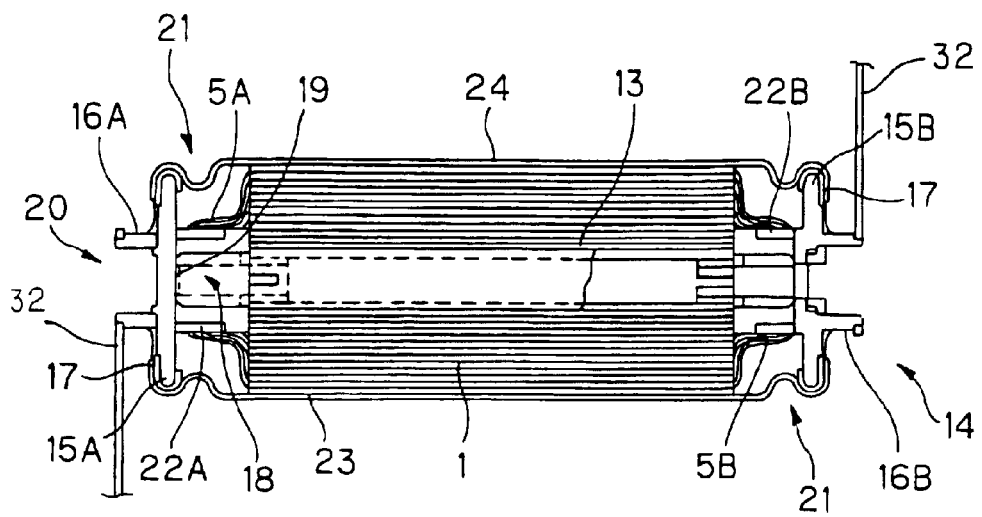
FIG. 18 is a sectional view showing an embodiment in an assembly of lithium battery cells which comprises a plurality of lithium secondary cells and a plurality of bus bars of the present invention.

As described later, in the present invention, a series of the lithium secondary cells may be connected via a bus bar to each other to provide a connected structure of lithium secondary cells. In that case, considering the connection resistance on currents, as shown in FIG. 18, it is preferable that the positive electrode external terminal 16A, the negative electrode external terminal 16B and the bus bar 32 to be brought into connection are made of the same kind of materials. For example, in the case where the positive electrode external terminal 16A is made of an Al member, it is preferable that the negative electrode external terminal 16B and the bus bar 32 are made of the Al member. Also in this case, due to negative electrode electric reaction, it is preferable to use a negative electrode external terminal 16B made of a Cu member or an Ni member.

Under the circumstances, as in the electrode cap in FIG. 6, if one adopts such a structure that the external terminal member (Al member), the internal terminal member (Cu member) are made of different kinds of materials; said terminals being bonded to lead out currents outside, respectively, and the plate member 25D in contact with the cell case is fixed with a packing 17 which does not pass currents, one may obtain an electrode cap capable of insulating currents of the positive electrode and the negative electrode.

Of course, a positive electrode external terminal member, the negative electrode external terminal member and the bus bar to be brought into connection with each other can also be constructed by Cu members and Ni members. In this case, it would be preferred to use in the negative electrode side an electrode cap having a pressure release function and capable of using the same kind of materials for the external terminal member and the internal terminal member therefor, and use in the positive electrode side a positive electrode cap having an insulating function formed by bonding the external and internal terminals being made of different kinds of materials, such as an external terminal member made of a Cu member or an Ni member for the external terminal member and an internal terminal member made of an Al member, taking into consideration positive electrode electro-chemical reaction.

Figure 7:
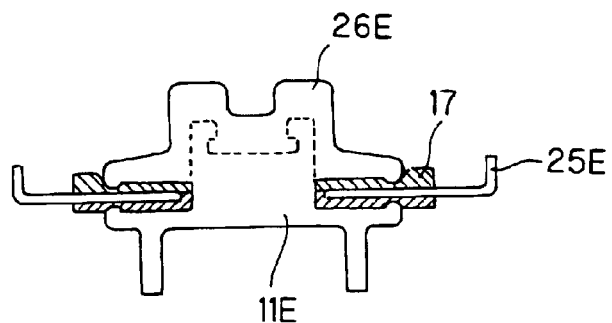
FIG. 7 is a sectional view showing an embodiment of another electrode cap having an insulating function in the lithium secondary cell of the present invention.

The cap shown in FIG. 7 is, like the embodiment shown in FIG. 6, a one comprising a thin plate member 25E, an external terminal member 26E made of an Al member, an internal terminal member 11E made of a Cu member, and a packing 17 which does not pass currents, wherein the external terminal and the internal terminal are bonded by sandwiching the packing at the outer portion therebetween. The feature of the cap of this type lies in the point that a specific device for an engaging shape between the external terminal member and the internal terminal member has been employed to intensify the bonding of the electrode cap. That is, the internal terminal member and the external terminal member are bonded by clamping forging with extruding a part of the external terminal member into the internal terminal member using a convex die or the like.

Figure 8:
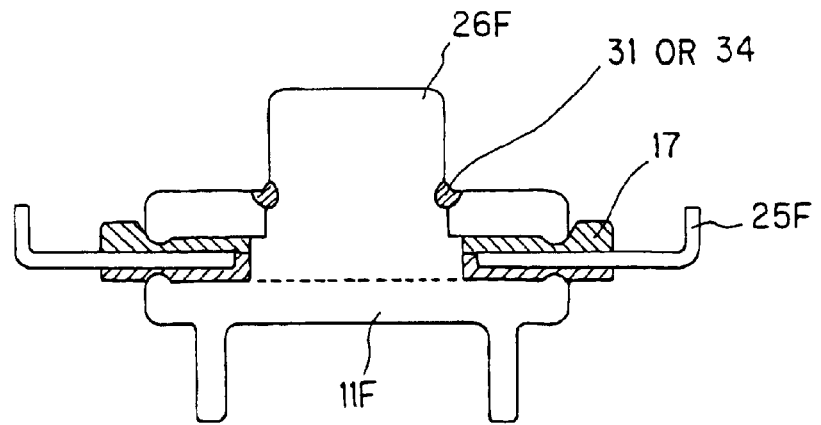
FIG. 8 is a sectional view showing an embodiment of still another electrode cap having an insulating function in the lithium secondary cell of the present invention.

The feature of the cap shown in FIG. 8 lies in the point that an external terminal member 26F is divided into a bonding member for bonding with the internal terminal member and a pressure bonding member for the packing 17, while the cap of this type also comprises the external terminal member 26F, and the internal terminal member 11F in addition to a thin plate member, like the one shown in FIG. 6. This is technologically easier compared with simultaneous bonding of the internal terminal member with the internal terminal member and pressure bonding of the packing 17 as in FIG. 6 and FIG. 7, and improvement in the yield factor in manufacturing can be expected. In this case, the bonding member and the pressure bonding member are preferably fixed by welding 34 or an adhesive 31.

Figure 9:
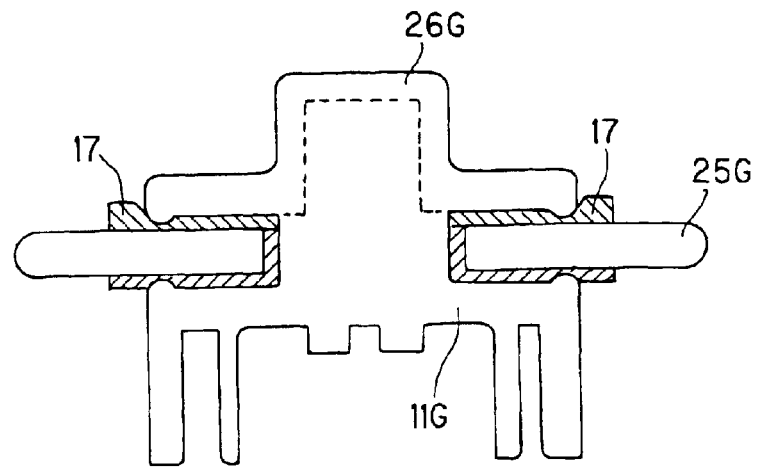
FIG. 9 is a sectional view showing an embodiment of still another electrode cap having an insulating function in the lithium secondary cell of the present invention.

The feature of the cap shown in FIG. 9 lies in the employment of a plate member 25G made of a bulky plate although the materials are same as in the above described caps. This type of the cap may have an enlarged contact face between the cell case and the electrode cap to disperse the vibration stress applied to the above described welding face when the cell is mounted on a vehicle at the time when the cell case and the electrode cap are welded in the manufacturing step of the cell afterward, and improvement in long-term vibration resistance performance of the cell can be expected.

That is, a lithium secondary cell according to the second aspect of the present invention is directed to a lithium secondary cell which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body; and two electrode caps sealing the above described internal electrode body at both ends of the cell case, wherein two electrode caps seal the above described internal electrode body at both open ends of the cell case;

wherein each of the electrode caps is provided with a plate member sealing said internal electrode body and disposed so as to seal both open ends of the cell case, an external terminal member protruding onto the surface of the above described electrode caps to lead out current to the outside of the cell case, and an internal terminal member brought into connection with the internal electrode body and taking out currents from the internal electrode body; and wherein at least two members selected from the group consisting of the plate member, the external terminal member and the internal terminal member are joined together for construction.

In general, as the electrode cap, the elastic body is preferably sandwiched among any of the plate member, the external terminal member and the above described internal terminal member respectively, and this elastic body preferably serves to insulate the positive electrode and the negative electrode electrically, and the electric resistivity of the elastic body is preferably not less than $10^{10}$ Ω/cm. As a result, the above described elastic body will become capable of insulating electricity among the plate member, the external terminal member and the internal terminal member, and the electricity between the positive electrode and the negative electrode in the cell can be cut off.

In addition, the elastic body is preferably made of at least two kinds of packing having different levels of hardness. For example, in the electrode cap in FIG. 10, the relatively soft one is used at the lower side (internal side of the cell) and the relatively hard one is used for the L-shaped type at the upper side (the fixing member side). A preferable exemplary combination of the elastic body is ethylene propylene rubber for the lower side and fluororesin for the upper side. As the elastic body for this use, the soft one is easier for use as a packing since it has a wide load-displacement range capable of maintaining 95% or more of elasticity maintenance percentage. However, on the contrary, when an external force such as vibration etc. is given, deformation will get large. Due to this, in between the terminal member 55B and the plate member 25I in FIG. 11 to which the most intensive stress would be given in the case where vibration etc. is given to the external terminal, lest insulation distance held by the packing 17 should fluctuate largely to cause short circuit in the worst case, a hard L-shaped type one is preferably used as the packing in the upper side. Incidentally, since it is important that the hard packing is used in the upper side, there are no problems with usage of the hard packing in the lower side.

In addition, two kinds of packing respectively having different load-displacement ranges maintaining elasticity maintaining percentage are used so that influence to be given to elasticity maintaining percentage of the packing by a load at the time of production and dispersion in displacement can be relieved.

Figure 10:
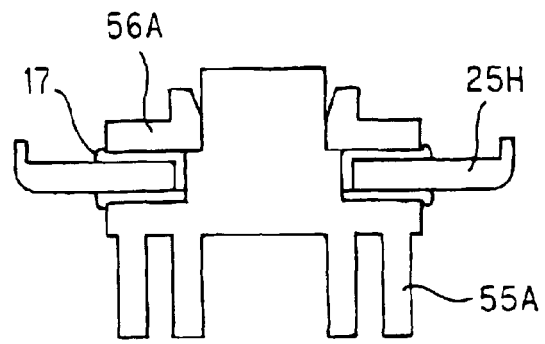
FIG. 10 is a sectional view showing an embodiment of an electrode cap using a fixing material in a lithium secondary cell of the present invention.
Figure 11:
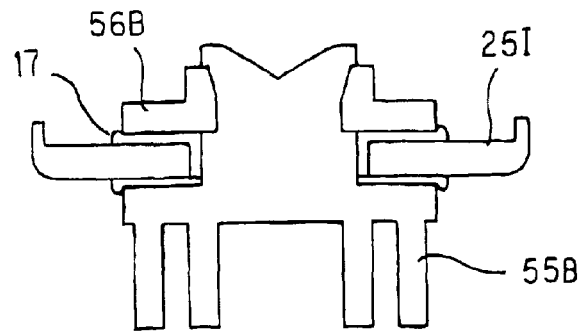
FIG. 11 is a sectional view showing an embodiment of an electrode cap using another fixing material in a lithium secondary cell of the present invention.
Figure 12A:
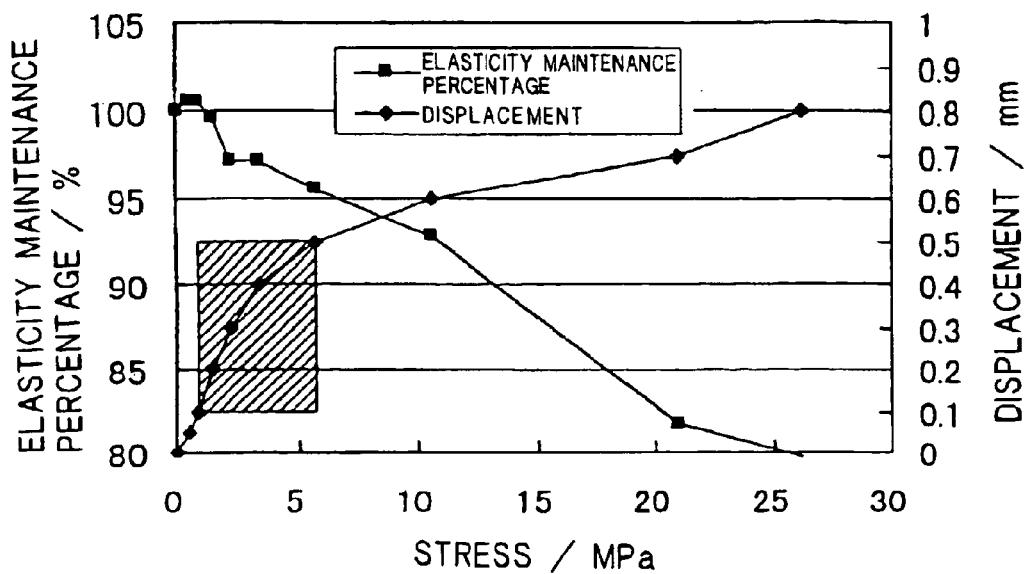
FIGS. 12(a)–(d) are graphs showing a relationship between elasticity maintenance percentage and displacement amount with respect to each kind of an elastic body.
Figure 12B:
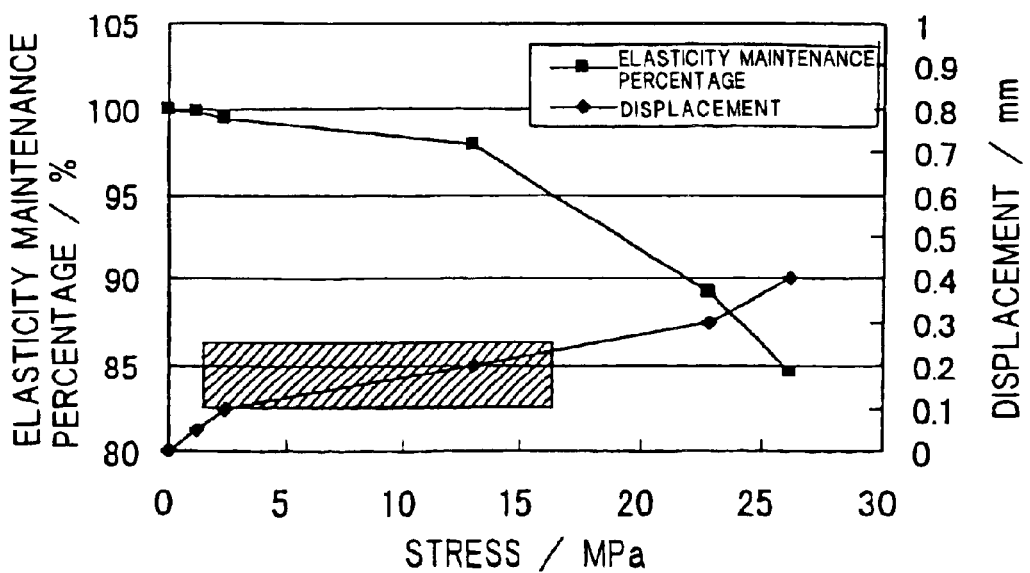
Figure 12C:
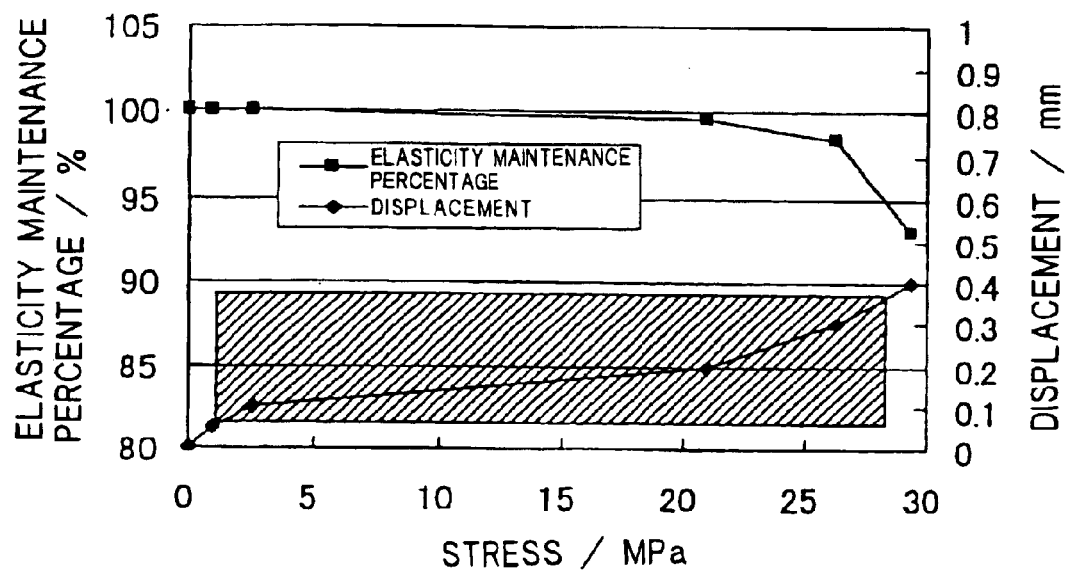
Figure 12D:
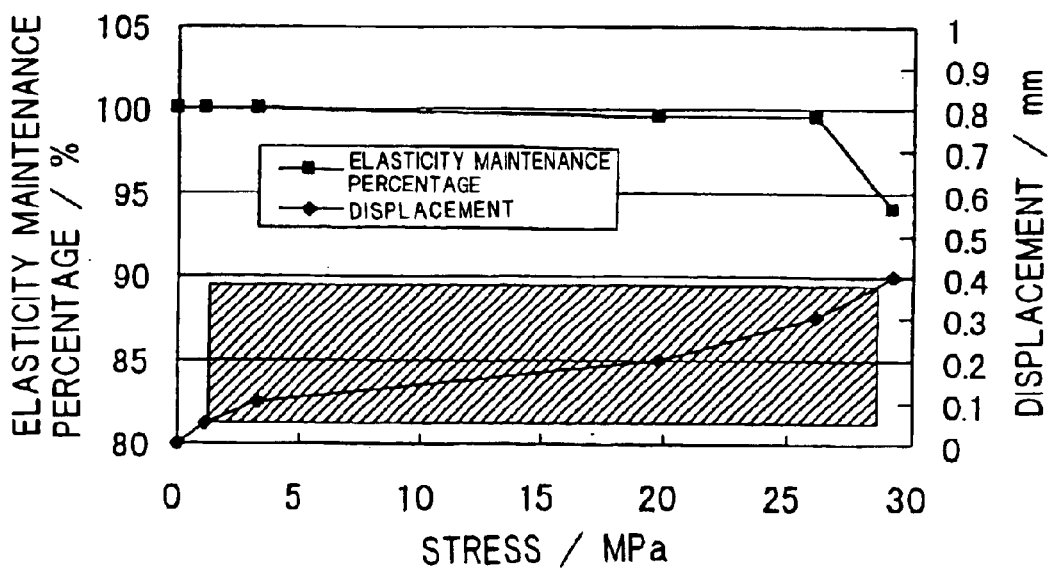

For this elastic body, as shown in FIG. 10 and FIG. 11, a packing 17 being an elastic body corresponding with the shape of the plate member and the terminal member is used, but this packing 17 is going to show appropriate elastic deformation by clamping processing. At the time of press-inserting the fixing material, it is preferable that the deformation amount in direction of pressure application for bonding of the elastic body attached by pressure application for bonding is larger than the spring back amount, and the force of pressure application for bonding applied to the elastic body is not more than the quantity of force to hold elasticity maintaining percentage of 95% or more.

The term "spring back amount" means a displacement amount from a reference position when a load is completely released by reducing the load gradually while monitoring with an autograph the displacement with the position at the time of finishing press-inserting the fixing material being the reference amount. Accordingly, with the deformation amount in the loading direction of the elastic body is larger than this spring back amount, no gaps will be given rise to even after the press-insertion is completed, and this serves to prevent leakage of electrolyte solution.

In addition, the elasticity maintaining percentage is expressed by changes in thickness before and after application of stress when stress for pressure application for bonding is applied to an elastic body of outside diameter 10 mm$\phi$×inside diameter 7 mm$\phi$×1 mm with an autograph, for example, and the stress for pressure application for bonding is released after elapse of predetermined time. That is, with $A_1$ being thickness of the elastic body prior to application of stress and $B_1$ being thickness of the elastic body after application of stress, elasticity maintaining percentage D is given by. $D=B_1/A_1 \times 100$.

The elastic body is preferably made of any of ethylene polypropylene rubber, polyethylene, polypropylene and fluororesin. FIGS. 12(A) to 12(D) are graphs showing elasticity maintaining percentage and displacement amounts on respective kinds of elastic body (12(A) ethylene propylene rubber, 12(B) fluororesin, 12(C) polyethylene, and 12(D) polypropylene) processed into sizes of outside diameter 10 mm$\phi$×inside diameter 7 mm$\phi$×1 mm in terms of relationship toward applied stress, and the shaded portions shown in respective graphs are suitable ranges according to the present invention. That is, with the elasticity maintaining percentage of 95% or more, elasticity is secured and surface pressure is secured.

In addition, the external terminal member as well as the internal terminal member is preferably constructed with different metals. This reflects consideration on electrical reaction in the positive electrode and the negative electrode to be described in detail later. At this time, at least two of the plate member, the external terminal member and the internal terminal member are preferably produced by one or more methods selected from a group consisting of friction bonding, brazing, welding, clamping, and forging clamping. This will serve to enable the electrode cap, which is appropriate to electric reaction of the positive electrode and the negative electrode and is easy for manufacturing, to be provided.

Next, the third aspect of the present invention will be described. A lithium secondary cell of the third aspect of the present invention is a lithium secondary cell which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; a cylindrical cell case being opened at both ends for housing the internal electrode body; and two electrode caps sealing the above described internal electrode body at both ends of the cell case, wherein each of the electrode caps is provided with a plate member sealing said internal electrode body and disposed so as to seal both open ends of the cell case, an external terminal member protruding onto the surface of the electrode caps to lead out current to the outside of the cell, an internal terminal member brought into connection with the internal electrode body and taking out currents from the above described internal electrode body, and an elastic body being sandwiched between the plate member and the external terminal member, and between the plate member and the internal terminal member so as to absorb impact of pressure application for bonding between the plate member and the terminal member; and wherein a fixing material is disposed so as to apply pressure for bonding the plate member, the terminal member and the elastic body at a predetermined position. This corresponds to an invention in which, as shown in FIG. 10 and FIG. 11, an element called as a fixing material is added to the electrode cap used in the second aspect of the present invention, and the employment of such a fixing material will serve to enable assembly of the electrode cap easier. This invention will be preferably constructed as follows.

The elastic body preferably insulates the positive electrode and the negative electrode electrically and preferably has electric resistivity of not less than $10^{10}$ $\Omega$/cm. Accordingly, the above described elastic body will become capable of insulating electricity among the plate member, the external terminal member and the internal terminal member, and electricity between the positive electrode and the negative electrode in the cell can be cut off.

In addition, the elastic body is preferably made of at least two kinds of packing having different levels of hardness. For example, in the electrode cap in FIG. 10, the relatively soft one is used at the lower side (internal side of the cell) and the relatively hard one is used for the L-shaped type at the upper side (the fixing member side). A preferable exemplary combination of the elastic body is ethylene propylene rubber for the lower side and fluororesin for the upper side. As the elastic body for this use, the soft one is easier for use as a packing since it has a wide load-displacement range capable of maintaining 95% or more of elasticity maintaining percentage. As the elastic body for this use, the soft one is easier for use as a packing with wide load-displacement range that can maintain 95% or more of elasticity maintaining percentage. However, on the contrary, when an external force such as vibration etc. is given, deformation will get large. Due to this, in between the terminal member 55B and the plate member 25I in FIG. 11 to which the most intensive stress would be given in the case where vibration etc. is given to the external terminal, lest insulation distance held by the packing 17 should fluctuate largely to cause short circuit in the worst case, a hard L-shaped type one is preferably used as the packing in the upper side. Incidentally, since it is important that the hard packing is used in the upper side, there are no problems with usage of the hard packing in the lower side.

In addition, two kinds of packing respectively having different load-displacement ranges maintaining elasticity maintaining percentage are used so that influence to be given to elasticity maintaining percentage of the packing by a load at the time of production and dispersion in displacement can be relieved.

For this elastic body, as shown in FIG. 10 and FIG. 11, a packing being an elastic body corresponding with the shape of the plate member and the terminal member is used, but this packing is going to show appropriate elastic deformation by clamping processing. At the time of press-inserting the fixing material, it is preferable that the deformation amount indirection of pressure application for bonding of the elastic body attached by pressure application for bonding is larger than the spring back amount, and the force of pressure application for bonding applied to the elastic body is not more than the quantity of force to hold elasticity maintaining percentage of 95% or more.

The spring back amount refers to a displacement amount from a reference position when a load is completely released by reducing the load gradually while monitoring with an autograph the displacement with the position at the time of finishing press-inserting the fixing material being the reference amount. Accordingly, with the deformation amount in the loading direction of the elastic body is larger than this spring back amount, no gaps will be given rise to even after the press-insertion is completed, and this serves to prevent leakage of electrolyte solution.

In addition, the elasticity maintaining percentage is expressed by changes in thickness before and after application of stress when stress for pressure application for bonding is applied to an elastic body of outside diameter 10 mm$\phi$×inside diameter 7 mm$\phi$×1 mm with an autograph, for example, and the stress for pressure application for bonding is released after elapse of predetermined time. That is, with $A_1$ being thickness of the elastic body prior to application of stress and $B_1$ being thickness of the elastic body after application of stress, elasticity maintaining percentage D is given by $D=B_1/A_1\times100$.

The elastic body is preferably made of any of ethylene polypropylene rubber, polyethylene, polypropylene and fluororesin. FIGS. 12(A) to 12(D) are graphs showing elasticity maintaining percentage and displacement amounts on respective kinds of elastic body (12(A) ethylene propylene rubber, 12(B) fluororesin, 12(C) polyethylene, and 12(D) polypropylene) processed into sizes of outside diameter 10 mm$\phi$×inside diameter 7 mm$\phi$×1 mm in terms of relationship toward applied stress, and the shaded portions shown in respective graphs are suitable ranges related to the present invention. That is, with the elasticity maintaining percentage of 95% or more, elasticity is secured and surface pressure is secured.

In addition, in the third aspect of the present invention, a part of the inner peripheral wall of the fixing material preferably has an inclination toward the outer peripheral wall of the terminal member. Therefore, the head portion is flattened to deform the terminal member in order that the fixing member will not come off. Provision of inclination can cause local deformation only in the tip portion of the terminal member to be avoidable. In case of local deformation, stress at the time of deformation is concentrated to give rise to possibility that failure such as cracks in materials in the worst case takes place. At this time, the inclination is preferably not more than 30°. When the inclination is made larger, then the entire deformation amount (total volume of the deformed portion) will get larger, giving rise to possibility that failure takes place as in the case where deformation is localized. From the viewpoint of balance between local deformation and the deformation amount, inclination is preferably not more than 30°.

In addition, in the third aspect of the present invention, hardness of the fixing material is preferably the same as or larger than hardness of the terminal member. Therefore, in case of adopting the above described head deformation, hardness of the fixing member is preferably made same or larger in order to prevent the fixing member from getting deformed. In particular, the fixing material and the terminal member are preferably made of any of Al, Al alloy, Cu, Cu alloy, brass and stainless steel. As for combinations, when the fixing material is Al alloy A5056, it is preferable to use Al alloy A3003 for the terminal member; when the fixing material is Cu, Al for the terminal member; when the fixing material is Cu, Cu for the terminal member; when the fixing material is brass, Cu for the terminal member; and when the fixing material is stainless steel, Cu for the terminal member. At this time, the terminal member preferably has a stopper structure in order not to apply to the elastic body not less than constant force of pressure application for bonding.

In addition, in the third aspect of the present invention, with the central axis of the terminal member being an axis, $r_1$ (mm) being the radius of the upper end of the terminal member and $r_2$ (mm) being the inside diameter of the upper end of the fixing material when the side on which the fixing material is disposed is placed upper than the position of the plate member being a reference, $r_1$ and $r_2$ preferably fulfill $r_1>r_2$. At this time, with $\Delta r$ (mm) being balance of $r_1$ (mm) and $r_2$ (mm), $\Delta r$ preferably fulfills relationship of $\Delta r\geq 0.2$ mm. Since this will serve to result in a state where the fixing member is brought into engagement with the terminal member, strength of the electrode cap in combination will get intensive.

In addition, in the third aspect of the present invention, with the central axis of the terminal member being an axis, when the side on which the fixing material is disposed is placed upper than the position of the plate member being a reference, the upper end of the terminal member preferably protrudes from the upper end of the fixing material. Such arrangement will make handling easier when current is taken out or when a cell is connected with another cell.

In addition, in the third aspect of the present invention, with $M_1$ (ton) being force to extract the press-inserted fixing material and $M_2$ (ton) being elastic force of the elastic body, $M_1$ and $M_2$ preferably fulfill relationship of $M_1 > M_2$. This will serve to stabilize pressure application for bonding of the fixing material. At this time, $M_1$ and $M_2$ preferably fulfill relationship of $M_1 \geq_2 \times 2$. Thus, with the force to extract the fixing materials twice or more than the elastic force of the elastic body, its safety percentage will get high. Moreover, $M_1$ preferably fulfills relationship of $M_1 \geq 1$ (ton). Actually, in the construction (kinds of a packing are described above) as well as shape in FIG. 11, elastic force, that is, $M_2$ of the packing 17 will be approximately 500 kg. Since the relationship between $M_1$ and $M_2$ preferably fulfills the relationship of $M_1 \geq M_2 \times 2$, $M_1$ will be preferably not less than 1 ton.

In addition, in the third aspect of the present invention, the upper end surface of the terminal member is preferably concave. As shown in FIG. 11, with the upper end surface of the terminal member 55B being concave, the cell using this electrode cap will be fixed easier when another cell is brought into connection therewith with, for example, a bus bar.

The electrode cap in the lithium secondary cell of the present invention is exemplified in FIG. 3 to FIG. 11 as an illustrative example, and all of them can be completed as an integrated body by bringing respective component members of the electrode cap into combination. That is, with the electrode cap structure of the present invention, the above described electrode cap in its entirety can be produced separately in advance as a component. Therefore, the electrode cap completed as one component can be easily brought into bonding with the internal electrode body to structure a cell element, which is directly inserted into a cell case to be sealed thereafter, to complete a lithium secondary cell. Thus, sealing a completed electrode cap, which already has function as an electrode cap and has undergone quality checks, with a cell case and the above described structure makes it possible to manufacture a cell with less number of steps, and therefore, manufacturing costs can be reduced and failure such as leakage of electrolyte solution etc. can be controlled by far.

So far, embodiments of the lithium secondary cell of the present invention have been described, but the present invention will not be limited to the above-described embodiments in any means. Construction conditions of such lithium secondary cell of the present invention are suitably adopted for those with cell capacity of 2 Ah or more. In addition, there are no limitations on application of the cell, which can be suitably used in particular for starting an engine and driving motor of an electric vehicle or a hybrid electric vehicle as large capacity cell to be mounted on a vehicle requiring high output, low internal resistance and excellent cycle feature.

An assembly of lithium battery cells of the fourth aspect of the present invention is an assembly of lithium battery cells which comprises a plurality of lithium secondary cells and a plurality of bus bars bringing into connection a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; and a cylindrical cell case housing said internal electrode body;
wherein a positive electrode external terminal member of one of the plurality of the lithium secondary cells and a negative external terminal member of the lithium secondary cells other than said one of the plurality of the lithium secondary are brought into connection with a bus bar for construction. Here, the term "bus bar" means a member for bringing a positive electrode external terminal member of one of the plurality of the lithium secondary cells and a negative electrode external terminal member of the other than said one of the plurality of the lithium secondary cells into connection, and a metal material having good conductivity and small connection resistance against external terminals is used, and punching metal or mesh can be suitably used as its shape.

It is preferred that said cylindrical cell case is opened at both ends for housing the internal electrode body, that the internal electrode body is sealed by two electrode caps at both ends of the cell case, and that each of the electrode caps comprises a plate member, an external terminal member and an internal terminal member.

Figure 20:
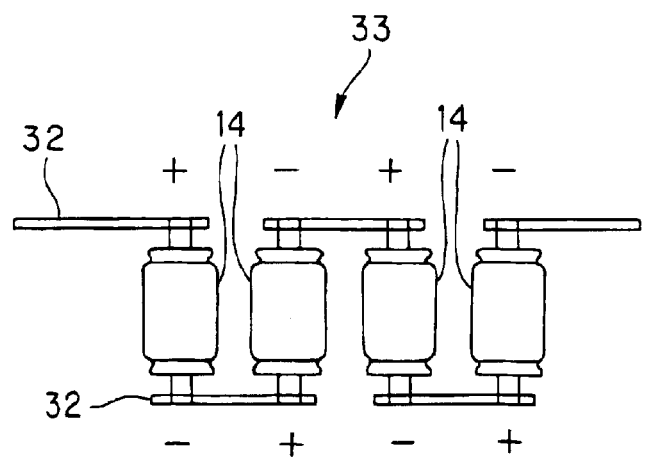
FIG. 20 is a schematic view showing a bus bar connecting structure body in a plurality of lithium secondary cells.

With this connecting structure, fixation of cells individually with an appropriate frame will make it possible to store the cells 14 by overlapping them vertically and horizontally as shown in FIG. 20 so that a number of cells 14 can be stored compactly.

The fourth aspect of the present invention preferably includes a lithium secondary cell having at least one of electrode caps having a pressure release hole and is formed by bonding with a bus bar so as not to block the pressure release hole. In particular, in case of adopting a lithium secondary cell that has the pressure release hole being disposed in a position corresponding with the center axis of the winding core, the center axis of the winding core being coaxial with the center axis of the cell case, and the external terminal member having a hollow portion and that is structured by using this hollow portion as the pressure release path of the pressure release hole, the bus bar preferably has a shape not to block the above described hollow portion. That is, as shown in FIG. 18, bonding being executed by providing the bus bar 32 with a hollow portion so as not to block the hollow portion of the external terminal, simple and easy bus bar connecting structure can be realized without hampering the pressure release function of the cell 14.

In addition, the fourth aspect of the present invention preferably has a bus bar structure with the bus bar and the external terminal to be bonded by welding. This will serve to reduce connection resistance among cells so that resistance of the connection structure as a whole can be controlled and a large output can be realized from cells.

An assembly of lithium battery cells of the fifth aspect of the present invention is an assembly of lithium battery cells which comprises a plurality of lithium secondary cells and a plurality of bus bars bringing into connection with bus bars a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; and a cylindrical cell case housing said internal electrode body;
wherein the bus bar and the external terminal member are bonded by welding, and a portion of the bus bar being welded with the external terminal member and a portion of the external member being welded with the bus bar are made of same kind of metal. This will serve to make it possible to reduce connection resistance so that outputs from the connecting structure body of the lithium secondary cell will increase.

It is preferred that said cylindrical cell case is opened at both ends for housing the internal electrode body, that the internal electrode body is sealed by two electrode caps at both ends of the cell case and that each of the electrode caps comprises a plate member, an external electrode member and an internal electrode member.

An assembly of lithium battery cells of the sixth aspect of the present invention is an assembly of lithium battery cells which comprises a plurality of lithium secondary cells and a plurality of bus bars bringing into connection with bus bars a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; and a cylindrical cell case housing said internal electrode body;

wherein the bus bar and the external terminal member are bonded by welding, and the bus bar and the external terminal member are made of same kind of metal. This can reduce connection resistance; is simple and easy; and is preferable in particular.

It is preferred that the cylindrical cell case is opened at both ends for housing the internal electrode body, that the internal electrode body is sealed by two electrode caps at both ends of the cell case, and that each of the electrode caps comprises a plate member, an external terminal member and an internal terminal member.

In the sixth invention, Al or Al alloy is suitably used for the internal terminal member as well as the plate member in the positive electrode side, and in conformity with this member material, Al or Al alloy is preferably used for the external terminal members of the positive electrode and the negative electrode and the one including Al as a major component is used for the bus bar. In addition, Cu or Cu alloy is suitably used for the internal terminal member and the plate member of the negative electrode side. In conformity with this member material, Cu or Cu alloy is used for the external terminal members of the positive electrode and the negative electrode, and the one including Cu as the major component is used for the bus bar. Moreover, in the lithium secondary cell of the present invention, Ni or Ni alloy is suitably used for the internal terminal member as well as the plate member of the negative electrode side. In conformity with this member material, Ni or Ni alloy is used for the external terminal members for the positive electrode and the negative electrode, and the one with Ni as the major component is used for the bus bar. For the material of these bus bars, among those with Al, Cu or Ni as major components, the purer one provides better flow of electricity and is used more suitably. However, compared with Al and Cu, Ni metal is somewhat expensive, and can be said not to be preferable in terms of costs. Under the circumstances, Al, Cu, and moreover those undergoing Ni plating onto iron and SUS can be used for the external terminal members of the positive electrode and the negative electrode and the bus bars, and here Ni or Ni alloy and those with Ni as the major component denote a concept including those undergoing Ni plating. Thus, it is important to control connection resistance by using the same one as the external terminal member to be brought into connection with the lithium secondary cell as much as possible based on availability for the bus bar material.

An assembly of lithium battery cells of the seventh aspect of the present invention is an assembly of lithium battery cells which comprises a plurality of lithium secondary cells and a plurality of bus bars bringing into connection, by way of bonding by welding a plurality of the bus bars and the external terminal members, a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; and a cylindrical cell case housing said internal electrode body;

wherein the bus bar is formed by bonding different kinds of metals.

It is preferred that the cylindrical cell case is opened at both ends for housing the internal electrode body, that the internal electrode body is sealed by two electrode caps at both ends of the cell case, and that each of the electrode caps comprises a plate member, an external terminal member and an internal terminal member.

Figure 23:
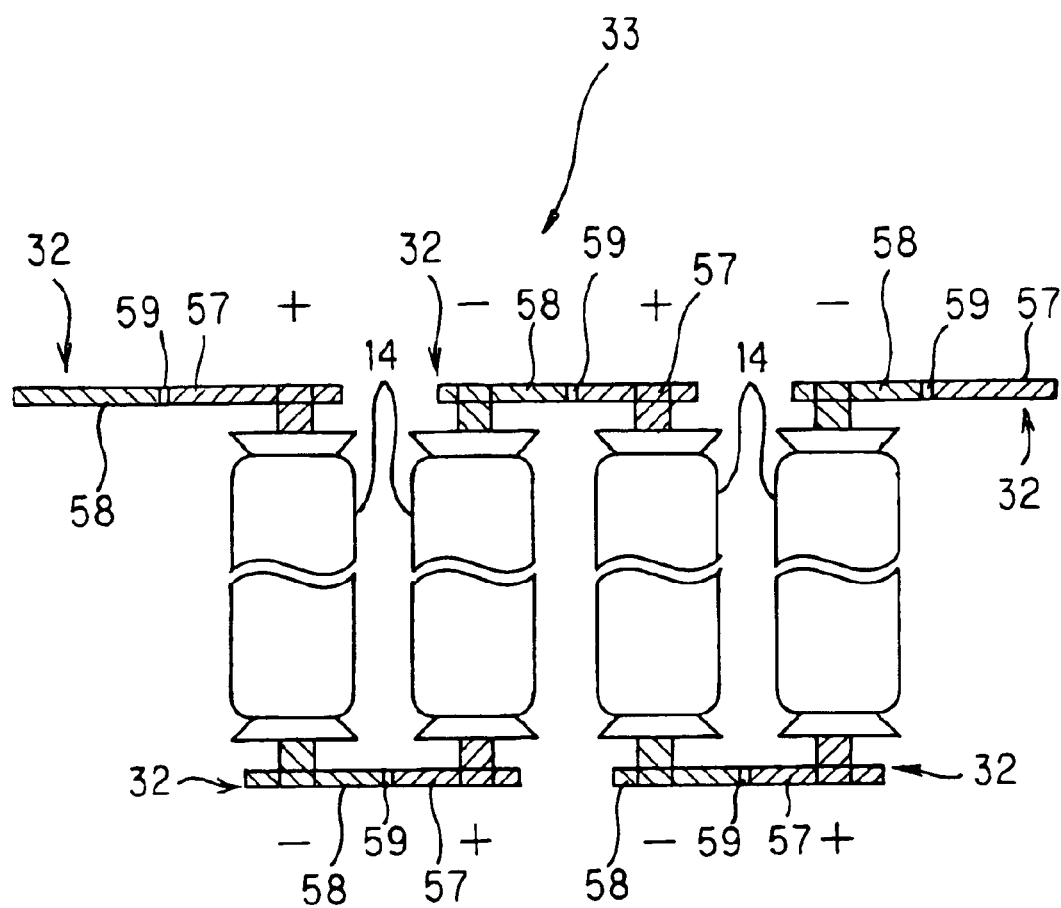
FIG. 23 is a schematic view showing an embodiment in an assembly of lithium battery cells which comprises a plurality of lithium secondary cells and a plurality of bus bars of the present invention.

In the lithium secondary cell, due to electro-chemical reaction of the positive electrode and the negative electrode, Al member must be used for the internal terminal member of the positive electrode and Cu member or Ni member must be used for the internal terminal member of the positive electrode. In addition, considering connection resistance of currents, the positive electrode external terminal member, the negative electrode external terminal member, and the bus bars are preferably produced with the same kinds of materials. Therefore, in the second embodiment, as shown in FIG. 6, different kinds of materials are adopted for the external terminal member (Al member) and the internal terminal member (Cu member), and the same kind of material as the external terminal member is adopted for the bus bars so as to attain control of connection resistance. Nevertheless, in the seventh invention, as shown in FIG. 23, in the case where Al member is used for the positive electrode external terminal member and Cu member or Ni member is used for the negative electrode external terminal member, that is, different metals are used for the external terminals of the positive electrode and the negative electrode, the bus bar is a bonded body of different kinds of metals by bonding Al member 57, Cu member, or Ni member 58 and the quality of the bus bar is selected in conformity of the external terminal member so as to attain control of connection resistance.

In particular, it is preferable that the positive electrode external terminal is made of Al or Al alloy, the negative electrode external terminal is made of Cu or Cu alloy, and the bus bar is formed by bonding the one with Al as the major component and the one with Cu as the major component. In addition, it is preferable that the positive electrode external terminal is made of Al or Al alloy, the negative electrode external terminal is made of Ni or Ni alloy, and the bus bar is formed by bonding the one with Al as the major component and the one with Ni as the major component.

Figure 21A:
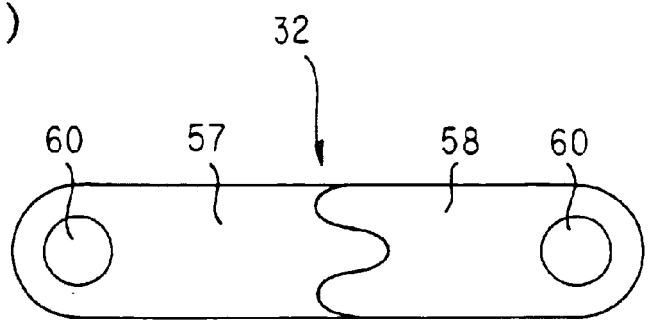
FIGS. 21(*a*)–(*c*) are top views showing an embodiment of a bus bar in an assembly of lithium battery cells which comprises a plurality of lithium secondary cells and a plurality of bus bars of the present invention.

At this time, the bus bar is preferably the one produced by one or more methods selected from a group consisting of friction bonding, brazing, welding, clamping, and forging clamping, press-insertion, enveloped casting, explosive welding and close fit, and any combination of those methods. In particular, as shown in FIG. 21(A), a bus bar 32, which is formed by bonding different kinds of metals with the Al member 57 and the Cu member or the Ni member 58 undergoing friction bonding, can be produced. In addition, as shown in FIG. 21(B) and FIG. 21(C), the ring-form Cu member 58 can be produced in the plate-form Al member 57 having a hole 60 by close fit or the ring-form Al member 57 can be produced in the plate-form Cu member or Ni member 58 having a hole 60 by close fit.

Figure 22:
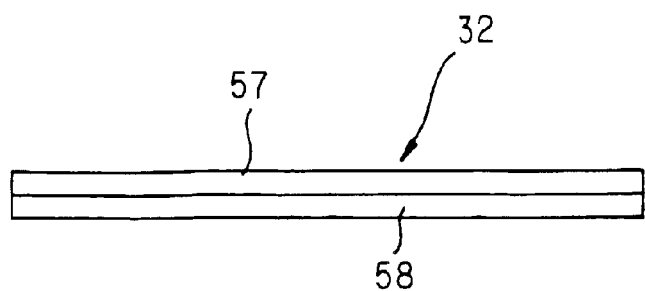
FIG. 22 is a sectional view showing an embodiment of another bus bar in an assembly of lithium battery cells which comprises a plurality of lithium secondary cells and a plurality of bus bars of the present invention.

In addition, as shown in FIG. 22, the plate-form Al member 57 and the plate-form Cu member or Ni member 58 can be produced by sticking them together by way of brazing. In this case, it is preferable that the positive electrode external terminal member (Al member) of one lithium secondary cell and the negative electrode external terminal member of the other lithium secondary cell are brought into contact with the bus bar, and the respective external terminal member and the bus bar are bonded by welding. At this time, the positive electrode external terminal member made of Al is not bonded with the Cu portion of the bus bar but bonded with the Al portion. The negative electrode terminal member made of Cu is not bonded with the Al portion of the bus bar, but bonded with the Cu portion.

Figure 19:
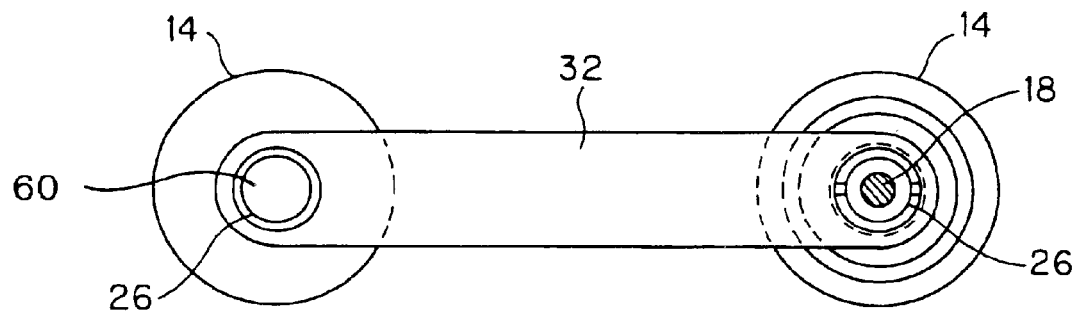
FIG. 19 is an explanatory view showing a bus bar connecting state in a plurality of lithium secondary cells.
Figure 21B:
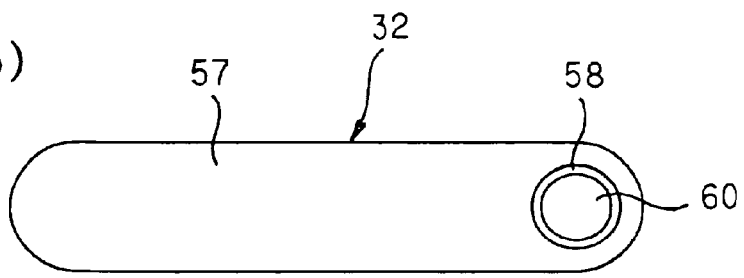
Figure 21C:
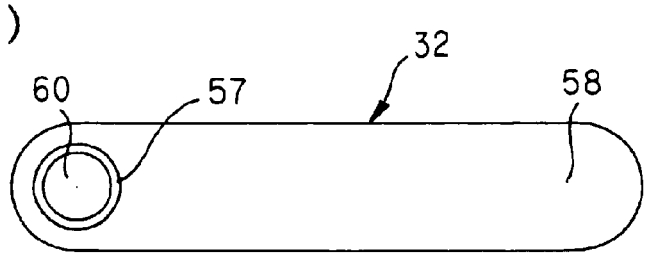

Incidentally, the holes 60 shown in FIG. 21(A), FIG. 21(B), and FIG. 21(C) are those for bonding with the external terminal member similarly to the hole in FIG. 19, but the point of the present invention is that the bus bar is formed by bonding different kinds of metals, and there are no limitations in particular with respect to existence of holes, shapes of bus bars, etc.

An assembly of lithium battery cells of the eighth aspect of the present invention is an assembly of lithium battery cells which comprises a plurality of lithium secondary cells and a plurality of bus bars bringing into connection a plurality of lithium secondary cells each of which comprises an internal electrode body including a hollow cylindrical winding core, a positive electrode plate and a negative electrode plate wound around an external peripheral wall of the hollow cylindrical winding core with a separator disposed therebetween, a nonaqueous electrolyte solution impregnating inside the internal electrode body; and a cylindrical cell case housing the internal electrode body;

wherein a positive electrode external terminal member of one of the plurality of the lithium secondary cells and a negative external terminal member of the lithium secondary cells other than said one of the plurality of the lithium secondary cells are brought into connection with a bus bar.

It is preferred that the cylindrical cell case is opened at both ends for housing the internal electrode body, that the internal electrode body is sealed by two electrode caps at both ends of the cell case, and that each of the electrode caps comprises a plate member, an external terminal member and an internal terminal member.

It is further preferable that at least one of said electrode caps has a pressure release hole, and each of the electrode caps is provided with a plate member sealing said internal electrode body and disposed so as to seal both open ends of the cell case, an external terminal member protrudes onto the surface of the above described electrode caps to lead out currents to outside, and that an internal terminal member is brought into connection with the internal electrode body so as to take out currents from the internal electrode body.

It is further preferable that at least two members selected from the groups consisting of the plate member, the external terminal member and the internal terminal member are bonded; that the pressure release hole is disposed in a position corresponding with central axis of the winding core and the central axis of the winding core is coaxial with central axis of the cell case, and that the external terminal member has a hollow portion so that the hollow portion functions as a pressure release path for the pressure release hole to construct a lithium secondary cell.

Adoption of such a lithium secondary cell as well as connecting structure body of the lithium secondary cells can provide a lithium secondary cell as well as connecting structure body of the lithium secondary cells that are structured simply and easily but can lead out high outputs and are highly reliable.

So far, embodiments of connecting structure body of the lithium secondary cell of the present invention have been described, but the present invention will not be limited to the above described embodiments in any means. Construction conditions of such connecting structure body of lithium secondary cells of the present invention are suitably adopted for those with cell capacity of lithium secondary cells being 2 Ah or more. In addition, the application of the lithium secondary cell is not limited anyway, but it can be suitably used in particular for starting an engine or for driving a motor of an electric vehicle or a hybrid electric vehicle as an assembly of lithium battery cells which comprises a plurality of large capacity cells to be mounted on a vehicle requiring high outputs, low internal resistance and excellent cycle feature.

The characteristic feature of the present lithium secondary cell lies in the employment of an electrode cap for sealing of the cell as well as current lead-out member of the cell. Accordingly, there are no limitations on the materials and cell structures other than the electrode cap. The general description on the major members constructing the cell as well as their structures will be given as follows.

Figure 13:
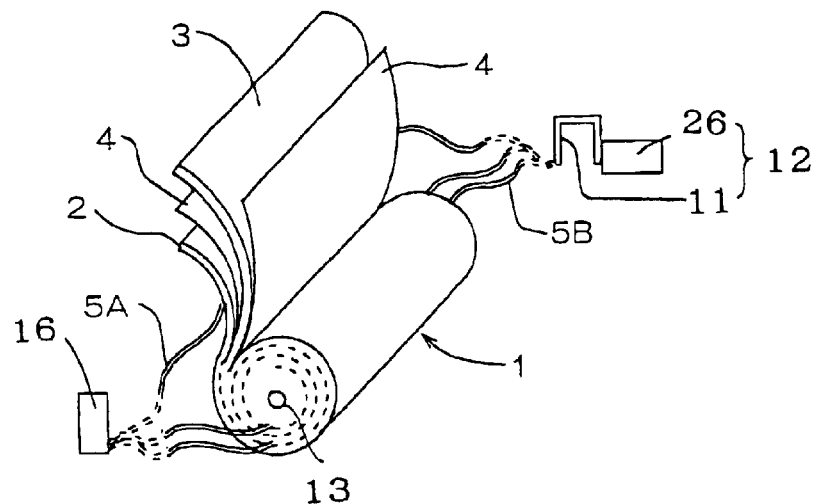
FIG. 13 is a perspective view showing an embodiment of a structure of a wound-type internal electrode body.

An internal electrode body of the lithium secondary cell of the present invention is constructed by winding or laminating the positive electrode plate and the negative electrode plate with a separator made of a porous polymer film sandwiched therebetween so that the positive electrode plate and the negative electrode plate are not brought into direct contact. In particular, the wound-type internal electrode body is formed as shown in FIG. 13 by winding the positive electrode plate 2 and the negative electrode plate 3 with the separator 4 sandwiched therebetween, and the electricity collection tabs 5A and 5B are disposed respectively to the positive electrode plate 2 and the negative electrode plate 3.

Figure 14:
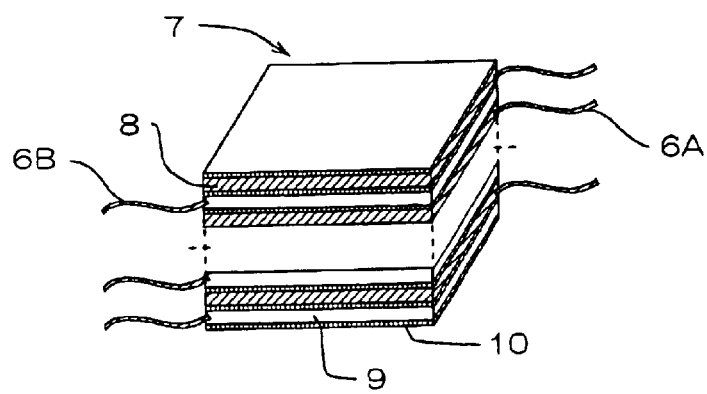
FIG. 14 is a perspective view showing an embodiment of a structure of a lamination-type internal electrode body.

On the other hand, as shown in FIG. 14, a lamination-type internal electrode body is structured by alternately laminating the positive electrode plate 8 and the negative electrode plate 9 on each other with the separator 10 being sandwiched therebetween and bringing the electricity collection tab 6A for the positive electrode and the electricity collection tab 6B for the negative electrode into connection respectively with the positive electrode plate 2 and the negative electrode plate 3.

All the positive electrode plates 2 and 8 and the negative electrode plates 3 and 9 are formed as thin plates by applying respective electrode active materials onto electricity collection substrates. As the shape of electricity collection substrate, foil, mesh, etc. are nominated, and in the present invention, an aluminum foil is suitably used as the electricity collection substrate for the positive electrode plates 2 and 8 and a copper foil and a nickel foil is suitably used as the negative electrode plates 3 and 9.

In addition, for the cells having any of the above described structures, in general, as a positive active material a lithium transition metal compound oxide such as lithium cobalt oxide ($LiCoO_2$), lithium nickel oxide ($LiNiO_2$), or lithium spinel manganese oxide ($LiMn_2O_4$), etc. is used. Incidentally, in order to improve conductivity of these positive active materials, it is also preferable that carbon powder such as acetylene black or graphite powder is mixed into the electrode active material. On the other hand, as a negative active material, an amorphous carbon material such as soft carbon or hard carbon, or carbon powder such as natural graphite or highly graphitized carbon material is used.

As a material of the separators 4 and 10, a three-layer structural material in which a lithium ion permeable polyethylene film having micropores is sandwiched between porous polypropylene films having lithium ion permeability is preferably used. This serves as a safety mechanism in which when the temperature of the internal electrode body is raised, the polyethylene film is softened at about 130° C. so that the micropores are collapsed to suppress the movement of lithium ions, that is, the cell reaction. With the polyethylene film being sandwiched between the polypropylene films having a softening temperature higher than the polyethylene film, the electrode plates 2 and 3 and the electrode plates 8 and 9 can be protected from contact/welding.

As having been described so far, according to the lithium secondary cell of the present invention, electrode caps are classified in terms of functions and those with respective members brought into bonding are used so that productivity can be improved. In addition, according to the connecting structure body of the lithium secondary cell of the present invention, connection resistance at the time when a plurality of cells are brought into connection is controlled so that the output performance can be improved and structure is simplified so that productivity can be improved. As a result, the lithium secondary cell and the connecting structure body of the lithium secondary cell of the present invention serve to give rise to a remarkable effect of improvement in productivity, output performance and reliability.

What is claimed is:

1. A lithium secondary cell, comprising:
    an internal electrode body including a hollow cylindrical winding core, a positive electrode plate and a negative electrode plate wound around an external peripheral wall of the hollow cylindrical winding core, a separator disposed between the positive and negative electrode plates, and a nonaqueous electrolyte solution impregnating the internal electrode body;
    a cylindrical cell case opened at both ends and housing the internal electrode body;
    electrode caps sealing the internal electrode body inside of the cell case at both open ends of the cell case, each of the electrode caps being provided with a plate member, and at least one of the electrode caps has a pressure release hole in a position corresponding with the central axis of the winding core;
    an external terminal member protruding onto the surface of the electrode caps to lead current outside of the cell, the entirety of the external terminal member being shielded from or not in contact with the interior of the cell case; and
    an internal terminal member directly contacting the external terminal member and brought into connection with the internal electrode body and taking current from the internal electrode body, the entirety of the internal terminal being shielded from or not in contact with the exterior of the cell case, wherein
    at least two members selected from the group consisting of the plate member, the external terminal member and the internal terminal member are joined together for construction.

2. The lithium secondary cell according to claim 1, wherein at least one of said plate member, said external terminal member, and said internal terminal member is produced by press processing or cold forging.

3. The lithium secondary cell according to claim 1, wherein at least two of said plate members said external terminal member and said internal terminal member are produced by a method selected from a group consisting of friction bonding, brazing, welding, clamping and forging clamping, and any combination of those methods.

4. The lithium secondary cell according to claim 1, wherein the central axis of said winding core is coaxial with the central axis of said cell case.

5. The lithium secondary cell according to claim 1, wherein said external terminal member has a hollow portion that functions as a pressure release path of said pressure release hole.

6. A lithium secondary cell, comprising:
    an internal electrode body including a hollow cylindrical winding core, a positive electrode plate and a negative electrode plate wound around an external peripheral wall of the hollow cylindrical winding core, a separator disposed between the positive and negative electrode plates, and a nonaqueous electrolyte solution impregnating the internal electrode body;
    a cylindrical cell case opened at both ends and housing the internal electrode body;
    electrode caps sealing the internal electrode body inside the cell case at both open ends of the cell case, each of the electrode caps being provided with a plate member;
    an external terminal member protruding onto the surface of the electrode caps to lead current outside of the cell;
    an internal terminal member brought into connection with the internal electrode body and taking current from the internal electrode body; and
    an elastic body sandwiched among any of said plate member, said external terminal member and said internal terminal member, wherein
    at least two members selected from the group consisting of the plate member, the external terminal member and the internal terminal member are joined together for construction, and the elastic body is made of at least two kinds of packing having different levels of hardness.

7. The lithium secondary cell according to claim 6, wherein said elastic body electrically insulates the positive and negative electrode plates from one another.

8. The lithium secondary cell according to claim 6, wherein said elastic body has an electric resistivity of not less than $10^{10}$ Ω/cm.

9. The lithium secondary cell according to claim 6, wherein an amount of deformation of said elastic body in a direction that pressure is applied for bonding is larger than an amount of elastic body spring back, and a force of pressure applied to said elastic body for bonding is not more than a quantity of force in which said elastic body holds an elasticity maintenance percentage of 95% or more.

10. The lithium secondary cell according to claim 6, wherein said elastic body comprises any one of ethylene polypropylene rubber, polyethylene, polypropylene and fluororesin.

11. The lithium secondary cell according to claim 6, wherein said external terminal member and said internal terminal member are constructed with different metals.

12. The lithium secondary cell according to claim 6, wherein said plate member, said external terminal member and said internal terminal member comprises any one of Al, Cu and Ni or alloys thereof, and at least two of said plate member, said external terminal member, and said internal terminal member are produced by a method selected from a group consisting of friction bonding, brazing, welding, clamping and forging clamping, and any combination of those methods.

13. The lithium secondary cell according to claim 6, wherein said cell case and said electrode caps are bonded by applying clamping processing pressure for bonding to the portion of said cell case in contact with said electrode caps and an outer peripheral portion of said electrode caps for forming and/or welding processing to weld an end portion of said cell case and the outer periphery of said electrode caps.

14. A lithium secondary cell, comprising:
an internal electrode body including a hollow cylindrical winding core, a positive electrode plate and a negative electrode plate wound around an external peripheral wall of the hollow cylindrical winding core, a separator disposed between the positive and negative electrode plates, and a nonaqueous electrolyte solution impregnating the internal electrode body;
a cylindrical cell case opened at both ends and housing the internal electrode body;
electrode caps sealing the internal electrode body inside the cell case at both open ends of the cell case, each of the electrode caps bang provided with a plate member;
an external terminal member protruding onto the surface of the electrode caps to lead current outside of the cell;
an internal terminal member brought into connection with the internal electrode body and taking current from the internal electrode body; and
an elastic body sandwiched among any of said plate member, said external terminal member and said internal terminal member, wherein
at least two members selected from the group consisting of the plate member, the external terminal member and the internal terminal member are joined together for construction, and an amount of deformation of said elastic body in a direction that pressure is applied to said elastic body for bonding is larger than an amount of elastic body spring back, and a force of pressure applied to said elastic body for bonding is not more than a quantity of force in which said elastic body holds an elasticity maintenance percentage of 95% or more.

15. The lithium secondary cell according to claim 14, wherein said elastic body electrically insulates the positive electrode and negative electrode plates from one another.

16. The lithium secondary cell according to claim 14, wherein said elastic body has an electric resistivity of not less than $10^{10}$ Ω/cm.

17. The lithium secondary cell according to claim 14, wherein said elastic body comprises at least two kinds of packing having different levels of hardness.

18. The lithium secondary cell according to claim 14, wherein said elastic body comprises any one of ethylene polypropylene rubber, polyethylene, polypropylene and fluororesin.

19. The lithium secondary cell according to claim 14, wherein said external terminal member and said internal terminal member are constructed with different metals.

20. The lithium secondary cell according to claim 14, wherein said plate member, said external terminal member and said internal terminal member comprises any one of Al, Cu and Ni or alloys thereof, and at least two of said plate member, said external terminal member and said internal terminal member are produced by a method selected from a group consisting of friction bonding, brazing, welding, clamping and forging clamping, and any combination of those methods.

21. The lithium secondary cell according to claim 14, wherein said cell case and said electrode caps ate bonded by applying clamping processing pressure for bonding to the portion of said cell case in contact with said electrode caps and an outer peripheral portion of said electrode caps for forming and/or welding processing to weld an end portion of said cell case and the outer periphery of said electrode caps.

22. A lithium secondary cell, comprising:
an internal electrode body including a hollow cylindrical winding core, a positive electrode plate and a negative electrode plate wound around an external peripheral wall of the hollow cylindrical winding core, a separator disposed between the positive and negative electrode plates, and a nonaqueous electrolyte solution impregnating the internal electrode body;
a cylindrical cell case housing the internal electrode body;
at least one electrode cap sealing the internal electrode body inside the cell case at least at one end of the cell case, said electrode cap being provided with a plate member;
an external terminal member protruding onto the surface of the electrode cap to lead current outside of the cell;
an internal terminal member brought into connection with the internal electrode body and talking current from the internal electrode body; and
an elastic body sandwiched among any of said plate member, said external terminal member and said internal terminal member, wherein
at least two members selected from the group consisting of the plate member, the external terminal member and the internal terminal member arm joined together for construction, and the elastic body is made of at least two kinds of packing having different levels of hardness.

23. The lithium secondary cell according to claim 22, wherein said elastic body electrically insulates the positive and negative electrode plates from one another.

24. The lithium secondary cell according to claim 22, wherein said elastic body has an electric resistivity of not less than $10^{10}$ Ω/cm.

25. The lithium secondary cell according to claim 22, wherein an amount of deformation of said elastic body in a direction that pressure is applied for bonding is larger than an amount of elastic body spring back, and a force of pressure applied to said elastic body for bonding is not more than a quantity of force in which said elastic body holds an elasticity maintenance percentage of 95% or more.

26. The lithium secondary cell according to claim 22, wherein said elastic body comprises any one of ethylene polypropylene rubber, polyethylene, polypropylene and fluororesin.

27. The lithium secondary cell according to claim 22, wherein said external terminal member and said internal terminal member are constructed with different metals.

28. The lithium secondary cell according to claim 22, wherein said plate member, said external terminal member and said internal terminal member comprises any one of Al, Cu and Ni or alloys thereof, and at least two of said plate member, said external terminal member, and said internal terminal member are produced by a method selected from a group consisting of friction bonding, brazing, welding, clamping and forging clamping, and any combination of those methods.

29. The lithium secondary cell according to claim 22, wherein sad cell case and said electrode cap are bonded by applying clamping processing pressure for bonding to the portion of said cell case in contact with said electrode cap and an outer peripheral portion of said electrode cap for forming and/or welding processing to weld an end portion of said cell case and the outer periphery of said electrode cap.

30. A lithium secondary cell, comprising:
- an internal electrode body including a hollow cylindrical winding core, a positive electrode plate and a negative electrode plate wound around an external peripheral wall of the hollow cylindrical winding core, a separator disposed between the positive and negative electrode plates, and a nonaqueous electrolyte solution impregnating the internal electrode body;
- a cylindrical cell case housing the internal electrode body;
- at least one electrode cap sealing the internal electrode body inside the cell case at least at one end of the cell case, said electrode cap being provided with a plate member;
- an external terminal member protruding onto the surface of the electrode cap to lead current outside of the cell;
- an internal terminal member brought into connection with the internal electrode body and taking current from the internal electrode body; and
- an elastic body sandwiched among any of said plate member, said extend terminal member and said internal terminal member, wherein
- at least two members selected from the group consisting of the plate member, the external terminal member and the internal terminal member are joined together for construction, and an amount of deformation of said elastic body in a direction that pressure is applied to said elastic body for bonding is larger than an amount of elastic body spring back, and a force of pressure applied to said elastic body for bonding is not more than a quantity of force in which said elastic body holds an elasticity maintenance percentage of 95% or more.

31. The lithium secondary cell according to claim 30, wherein said elastic body electrically insulates the positive electrode and negative electrode plates from one another.

32. The lithium secondary cell according to claim 30, wherein said elastic body has an electric resistivity of not less than $10^{10}$ Ω/cm.

33. The lithium secondary cell according to claim 30, wherein said elastic body comprises at least two kinds of packing having different levels of hardness.

34. The lithium secondary cell according to claim 30, wherein said elastic body comprises any one of ethylene polypropylene rubber, polyethylene, polypropylene and fluororesin.

35. The lithium secondary cell according to claim 30, wherein said external terminal member and said internal terminal member are constructed with different metals.

36. The lithium secondary cell according to claim 30, wherein said plate member, said external terminal member and said internal terminal member comprises any one of Al, Cu and Ni or alloys thereof, and at least two of said plate member, said external terminal member, and said internal terminal member are produced by a method selected from a group consisting of friction bonding, brazing, welding, clamping and forging clamping, and any combination of those methods.

37. The lithium secondary cell according to claim 30, wherein said cell case and said electrode cap are bonded by applying clamping processing pressure for bonding to the portion of said cell case in contact with said electrode cap and an outer peripheral portion of said electrode cap for forming and/or welding processing to weld an end portion of said cell case and the outer periphery of said electrode cap.

38. A lithium secondary cell, comprising:
- an internal electrode body including a hollow cylindrical winding core, a positive electrode plate and a negative electrode plate wound around an external peripheral wall of the hollow cylindrical winding core, a separator disposed between the positive and negative electrode plates, and a nonaqueous electrolyte solution impregnating the internal electrode body;
- a cylindrical cell case housing the internal electrode body;
- at least one electrode cap sealing the internal electrode body inside of the cell case at least at one end of the cell case, said electrode cap being provided with a plate member and has a pressure release hole in a position corresponding with the central axis of the winding core;
- an external terminal member protruding onto the surface of the electrode cap to lead current outside of the cell, the entirety of the external terminal member being shielded from or not in contact with the interior of the cell case; and
- an internal terminal member directly contacting the external terminal member and brought into connection with the internal electrode body and taking current from the internal electrode body, the entirety of the internal terminal being shielded from or not in contact with the exterior of the cell case, wherein
- at least two members selected from the group consisting of the plate member, the external terminal member and the internal terminal member are joined together for construction.

39. The lithium secondary cell according to claim 38, wherein at least one of said plate member, said external terminal member, and said internal terminal member is produced by press processing or cold forging.

40. The lithium secondary cell according to claim 38, wherein at least two of said plate member, said external terminal member and said internal terminal member are produced by a method selected from a group consisting of friction bonding, brazing, welding, clamping and forging clamping, and any combination of those methods.

41. The lithium secondary cell according to claim 38, wherein the central axis of said winding core is coaxial with the central axis of said cell case.

42. The lithium secondary cell according to claim 38, wherein said external terminal member has a hollow portion that functions as a pressure release path of said pressure release hole.

* * * * *

UNITED STATES PATENT AND TRADEMARK OFFICE
CERTIFICATE OF CORRECTION

PATENT NO.     : 6,844,110 B2
DATED          : January 18, 2005
INVENTOR(S)    : Akio Enomoto et al.

It is certified that error appears in the above-identified patent and that said Letters Patent is hereby corrected as shown below:

Title page,
Item [57], ABSTRACT, please delete the abstract in its entirety and replace with the following abstract:

-- A lithium secondary cell includes an internal electrode body having a positive electrode plate and a negative electrode plate wound and laminated around an external peripheral wall of a hollow cylindrical winding core. The inside of the internal electrode body is impregnated with a nonaqueous electrolyte solution. A cylindrical cell case houses the internal electrode body and has open ends sealed with plate member electrode caps. An external terminal member protrudes onto the surface of the electrode caps to lead current to the outside of the cell case, and an internal terminal member connects with the internal electrode body to take current from the internal electrode body. An elastic body and at least two of the plate member, the external terminal member and the internal terminal member are joined together for construction. An assembly of lithium secondary cells is also disclosed. --

Column 7,
Line 54, please delete "," after "electrode"

Column 27,
Line 67, please add -- , -- after "members"

Column 29,
Line 20, please change "bang" to -- being --
Line 60, please add -- , -- after second occurrence of "member"
Line 66, please change "ate" to -- are --

Column 30,
Line 28, please change "arm" to -- are --
Line 62, please change "sad" to -- said --

UNITED STATES PATENT AND TRADEMARK OFFICE
CERTIFICATE OF CORRECTION

PATENT NO. : 6,844,110 B2
DATED : January 18, 2005
INVENTOR(S) : Akio Enomoto et al.

It is certified that error appears in the above-identified patent and that said Letters Patent is hereby corrected as shown below:

Column 31,
Line 10, please change "scaling" to -- sealing --

Signed and Sealed this

Twenty-sixth Day of April, 2005

JON W. DUDAS
*Director of the United States Patent and Trademark Office*